(12) United States Patent
Koga et al.

(10) Patent No.: US 11,679,508 B2
(45) Date of Patent: Jun. 20, 2023

(54) ROBOT DEVICE CONTROLLER FOR CONTROLLING POSITION OF ROBOT

(71) Applicant: Fanuc Corporation, Yamanashi (JP)

(72) Inventors: Kentaro Koga, Yamanashi (JP);
Wataru Miyazaki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 331 days.

(21) Appl. No.: 16/923,485

(22) Filed: Jul. 8, 2020

(65) Prior Publication Data
US 2021/0031374 A1 Feb. 4, 2021

(30) Foreign Application Priority Data

Aug. 1, 2019 (JP) .............................. JP2019-142418
Dec. 3, 2019 (JP) .............................. JP2019-219104

(51) Int. Cl.
B25J 9/16 (2006.01)

(52) U.S. Cl.
CPC ........... B25J 9/1697 (2013.01); B25J 9/1664 (2013.01); B25J 9/1687 (2013.01); *G05B 2219/39391* (2013.01); *G05B 2219/39393* (2013.01); *G05B 2219/39395* (2013.01); *G05B 2219/39397* (2013.01)

(58) Field of Classification Search
CPC ...... B25J 9/1697; B25J 9/1664; B25J 9/1687; B25J 9/1684; G05B 2219/40555; G05B 2219/39387; G05B 2219/39391; G05B 2219/39393; G05B 2219/39395; G05B 2219/39397
See application file for complete search history.

(56) References Cited

U.S. PATENT DOCUMENTS

2014/0012416 A1* 1/2014 Negishi .................. B25J 9/1607
  700/251
2020/0368861 A1* 11/2020 Artigas .................. B25J 9/1633

FOREIGN PATENT DOCUMENTS

| JP | 2013180380 A | 9/2013 |
| JP | 2015214022 A | 12/2015 |
| JP | 2017170599 A | 9/2017 |

* cited by examiner

*Primary Examiner* — Spencer D Patton
(74) *Attorney, Agent, or Firm* — RatnerPrestia

(57) ABSTRACT

A first characteristic portion of a first workpiece and a second characteristic portion of a second workpiece are previously determined. A characteristic amount detection unit detects a first characteristic amount related to the position of the first characteristic portion and a second characteristic amount related to the position of the second characteristic portion in an image captured by a camera. A calculation unit calculates, as a relative position amount, the difference between the first characteristic amount and the second characteristic amount. A command generation unit generates a movement command for operating a robot based on a relative position amount in the image captured by the camera and a relative position amount in a predetermined reference image.

6 Claims, 16 Drawing Sheets

ROBOT DEVICE CONTROLLER FOR CONTROLLING POSITION OF ROBOT

CROSS-REFERENCE TO RELATED APPLICATIONS

This application is a new U.S. Patent Application that claims benefit of Japanese Patent Application No. 2019-142418, dated Aug. 1, 2019, and Japanese Patent Application No. 2019-219104, dated Dec. 3, 2019, the disclosures of these applications are incorporated herein by reference in their entirety for all purposes.

BACKGROUND OF THE INVENTION

1. Field of the Invention

The present invention relates to a robot device controller which controls the position of a robot.

2. Description of the Related Art

In a robot device equipped with a robot, an operation tool that is suitable for a desired operation is attached to the robot so that the desired operation can be performed. For example, a hand, as an operation tool, which grasps a workpiece is attached to the robot so that the robot device can convey the workpiece to a desired position.

The robot device can attach a workpiece grasped by the robot device to another workpiece and arrange the workpiece inside another workpiece by controlling the position and orientation of the workpiece when conveying the workpiece. When performing such an operation, it is preferable to strictly align the workpiece grasped by the robot device with another workpiece. For example, in a case in which an operation for fitting one workpiece to another workpiece is performed, the operation may fail if the position and orientation of one workpiece deviate from the position and orientation of another workpiece.

In prior arts, it is known that, when one workpiece is attached to another workpiece, the position of the robot is controlled using an image captured by a camera. For example, a goal image of one workpiece or another workpiece can be prepared. The camera captures an image of a workpiece when the robot device conveys the workpiece. Control for adjusting the position of the robot by comparing the image of the workpiece with the goal image is known (see, for example, Japanese Unexamined Patent Publication No. 2013-180380A and Japanese Unexamined Patent Publication No. 2015-214022A).

Further, control for previously calibrating a visual sensor coordinate system with respect to a robot coordinate system and calculating the three-dimensional position of a workpiece based on the position of the workpiece in the visual sensor coordinate system is known. Alternatively, a Jacobian matrix related to the position and size of a characteristic portion in an image can be previously generated. Control for correcting the position of a robot based on the position of a characteristic portion in an image captured by a camera, the position of the characteristic portion in the target data, and the Jacobian matrix is known (for example, see Japanese Unexamined Patent Publication No. 2017-170599A).

SUMMARY OF INVENTION

In a method which uses a Jacobian matrix so as to adjust the position of a robot, the movement amount of the robot can be calculated by multiplying the difference between the characteristic amounts of characteristic portions in an image by the Jacobian matrix. However, the Jacobian matrix may not be calculated accurately due to, for example, a measurement error in calculation of the Jacobian matrix. Further, the Jacobian matrix is calculated based on the position gap in the visual sensor coordinate system when the position of the robot is moved by a minute amount. Thus, the robot can be accurately driven in the vicinity of each characteristic portion. However, the accuracy decreases as the robot moves away from the characteristic portion. For example, there it the problem that the accuracy is low when the robot is moved by a large movement amount. As a result, the position of the robot may not be accurately controlled.

In a method for calibrating a visual sensor coordinate system, the three-dimensional position of the characteristic portion can be detected based on an image captured by a two-dimensional camera. However, in this method, it is necessary to previously calibrate the position of the visual sensor coordinate system with respect to the robot coordinate system.

One aspect of the present disclosure is a robot device controller which cause a robot to adjust the relative position of a second member with respect to a first member by moving the second member. The controller includes a visual sensor which captures images of the first member and the second member. The controller includes an operation control unit which transmits a command to the robot so as to drive the robot, and an image processing unit which processes images captured by the visual sensor. A first characteristic portion for detecting the position of the first member and a second characteristic portion for detecting the position of the second member are previously determined. The image processing unit includes a characteristic amount detection unit which detects a first characteristic amount related to the position of the first characteristic portion and a second characteristic amount related to the position of the second characteristic portion in the image captured by the visual sensor. The image processing unit includes a calculation unit which calculates, as a relative position amount, the difference between the first characteristic amount and the second characteristic amount. The image processing unit includes a command generation unit which generates a movement command for operating the robot. A relative position amount in a reference image including images of the first characteristic portion and the second characteristic portion when the second member is arranged at a target position with respect to the first member is determined. The command generation unit generates a movement command for operating the robot so that the second member is arranged at the target position with respect to the first member, based on a relative position amount in an image captured by the visual sensor and a relative position amount in the reference image including the images of the first characteristic portion and the second characteristic portion. The operation control unit changes the position of the robot based on the movement command.

DETAILED DESCRIPTION

A robot device controller in an embodiment will be described with reference to FIGS. 1 to 20. In the present embodiment, a robot device for assembling a product and a robot device for arranging a workpiece inside a case will be taken as examples and described.

Figure 1:
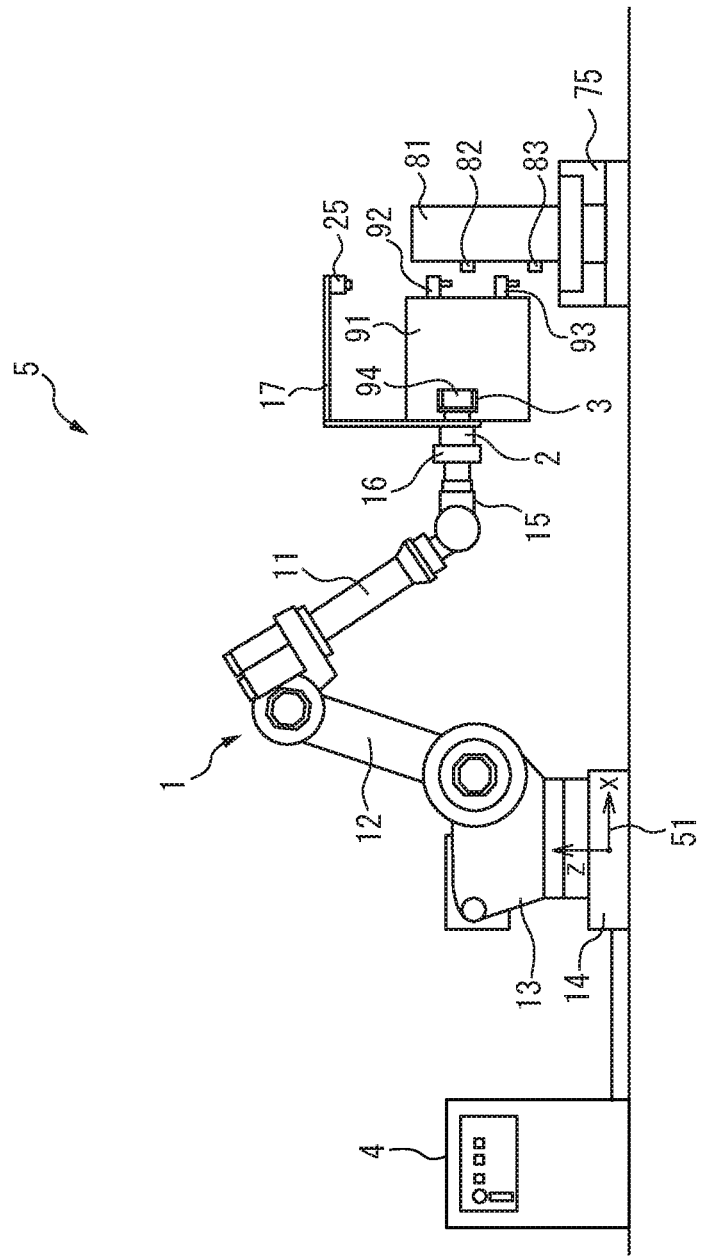
FIG. 1 is a schematic view of a first robot device in an embodiment.

FIG. 1 is a schematic view of a first robot device in the present embodiment. The first robot device 5 includes a hand 2 as an operation tool (end effector) and a robot 1 which moves the hand 2. The first robot device 5 attaches a second workpiece 91 as a second member to a first workpiece 81 as a first member.

The robot 1 is an articulated robot including a plurality of joints. The robot 1 includes a base part 14 and a swivel base 13 supported by the base part 14. The base part 14 is secured to the installation surface. The swivel base 13 is formed to rotate with respect to the base part 14. The robot 1 includes an upper arm 11 and a lower arm 12. The lower arm 12 is rotatably supported by the swivel base 13 via a joint. The upper arm 11 is rotatably supported by the lower arm 12 via a joint. Further, the upper arm 11 rotates about its rotation axis parallel to the extending direction of the upper arm 11.

The robot 1 includes a wrist 15 coupled to an end of the upper arm 11. The wrist 15 is rotatably supported by the upper arm 11 via a joint. The wrist 15 includes a flange 16 which is formed to rotate. The hand 2 secured to the flange 16. The robot 1 of the present embodiment has six drive axes, but the embodiment is not limited to this. Any robot which can move an operation tool can be adopted.

The hand 2 is an operation tool for grasping and releasing the workpiece 91. The hand 2 has a plurality of claw parts 3. The hand 2 is formed to open and close the claw parts 3. The claw parts 3 sandwich the workpiece 91 so as to grasp the workpiece 91. The hand 2 of the first robot device 5 has the claw parts 3, but the embodiment is not limited to this. As the hand, any configuration which is formed to be able to grasp a workpiece can be adopted. For example, a hand which grasps a workpiece by suction or magnetic force may be adopted.

The robot device 5 in the present embodiment includes a conveyor 75 as a carrier which conveys the first workpiece 81 to the robot 1. The carrier is arranged around the robot 1. The conveyor 75 is formed to convey the workpiece 81 to a predetermined position. The conveyor 75 is formed to convey the workpiece 81 at a predetermined movement speed.

In the first robot device 5 of the present embodiment, the robot 1 attaches the workpiece 91 to the workpiece 81 while the conveyor 75 continues to convey the workpiece 81. In other words, the workpiece 81 is moved by the conveyor 75 during an operation for attaching the workpiece 91. The robot 1 attaches the workpiece 91 to the workpiece 81 while changing its position and the orientation so as to follow the workpiece 81.

Figure 2:
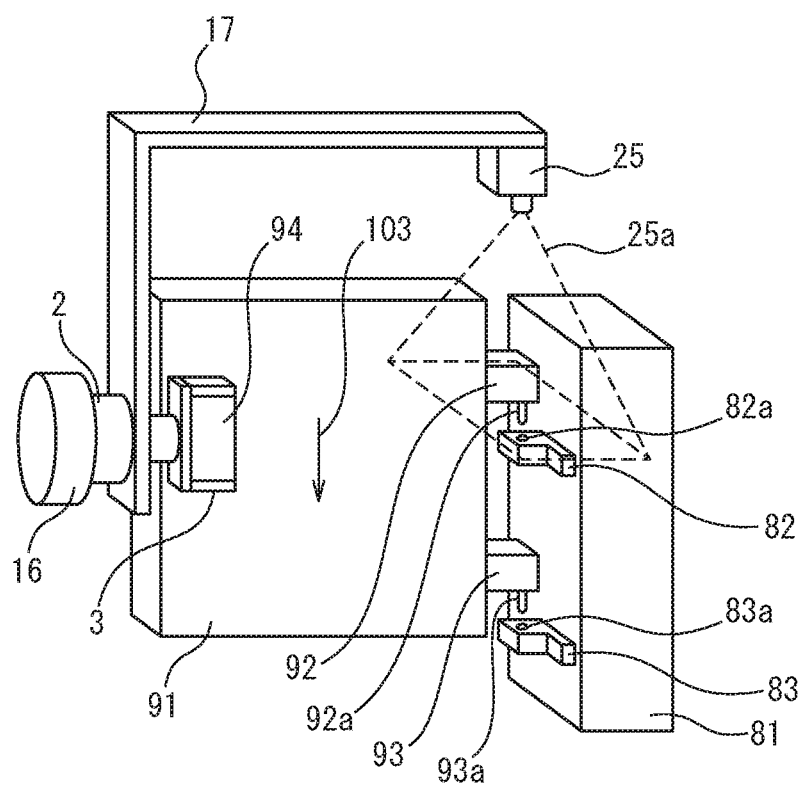
FIG. 2 is an enlarged perspective view of a first workpiece, a second workpiece, and a hand in the first robot device.

FIG. 2 is an enlarged perspective view of the first workpiece, the second workpiece, and the hand in the first robot device. Referring to FIGS. 1 and 2, the second workpiece 91 has a grip part 94 which projects from the surface of a main body. The claw parts 3 grasp the grip part 94 so that the hand 2 grasps the second workpiece 91.

The first workpiece 81 has projection parts 82 and 83 which project from the surface of the main body. The projection part 82 and the projection part 83 are spaced from each other. Further, the workpiece 81 is supported by the conveyor 75 so that the projection part 82 and the projection part 83 are arranged in the vertical direction. Holes 82a and 83a are formed in the upper surfaces of the projection parts 82 and 83, respectively. The second workpiece 91 has projection parts 92 and 93 which project from the surface of the main body. Pins 92a and 93a are secured to the projection parts 92 and 93, respectively. The pin 92a and the pin 93a are arranged linearly. In first control performed by the first robot device 5, the pin 92a is inserted into the hole 82a and the pin 93a is inserted into the hole 83a.

In the first control of the present embodiment, the pins 92a and 93a are controlled so as to be aligned with the holes 82a and 83a. The orientation of the workpiece 91 with respect to the workpiece 81 is adjusted before the first control is performed. In other words, the orientation of the robot 1 is adjusted so that the pins 92a and 93a of the workpiece 91 are arranged on a straight line extending in the vertical direction. Thus, in the first control, the control for arranging the pin 92a directly above the hole 82a is performed so that the pins 92a and 93a can be aligned with the holes 82a and 83a. After the first control of the present embodiment, a downward movement of the workpiece 91 in the vertical direction indicated by arrow 103 causes the pins 92a, 93a to be inserted into the holes 82a, 83a, and causes the workpiece 91 to be attached to the workpiece 81.

The robot device 5 includes a camera 25 as a visual sensor which captures images of the first workpiece 81 and the second workpiece 91. The camera 25 in the present embodiment is a two-dimensional camera. The camera 25 is supported by the hand 2 via the support member 17. The camera 25 in the robot device 5 changes its position and orientation together with the hand 2.

The camera 25 captures an image when the second workpiece 91 approaches the first workpiece 81. The camera 25 is arranged so as to capture an image of the vicinity of the portion in which the second workpiece 91 is engaged with the first workpiece 81. Further, the camera 25 is arranged so as to be able to capture an image of a first characteristic portion for detecting the position of the first workpiece 81 and an image of a second characteristic portion for detecting the position of the second workpiece 91. In the robot device 5, the camera 25 is arranged so as to capture images of the workpieces 81 and 91 from the position above the workpiece 81 and the workpiece 91.

A reference coordinate system 51 is set in the robot device 5. In the example shown in FIG. 1, the origin of the reference coordinate system 51 is arranged in the base part 14 of the robot 1. The reference coordinate system 51 is also referred to as a world coordinate system. The reference coordinate system 51 is a coordinate system in which the position of the origin is fixed, and the directions of the coordinate axes are fixed. Even when the position and orientation of the robot 1 change, the position and direction of the reference coordinate system 51 do not change. The reference coordinate system 51 has, as coordinate axes, an X-axis, a Y-axis, and a Z-axis which are orthogonal to one another. Further, a W-axis is set as a coordinate axis around the X-axis, A P-axis is set as a coordinate axis around the Y-axis, An R-axis is set as a coordinate axis around the Z-axis.

The position and orientation of the robot 1 can be represented by the reference coordinate system 51. For example, the position of the robot 1 can be represented by the position of a tool tip arranged at the tip of the hand 2. Further, a tool coordinate system which moves together with the hand 2 can be set at the tool tip. The orientation of the robot 1 can be represented by the direction of the tool coordinate system with respect to the reference coordinate system 51.

Figure 3:
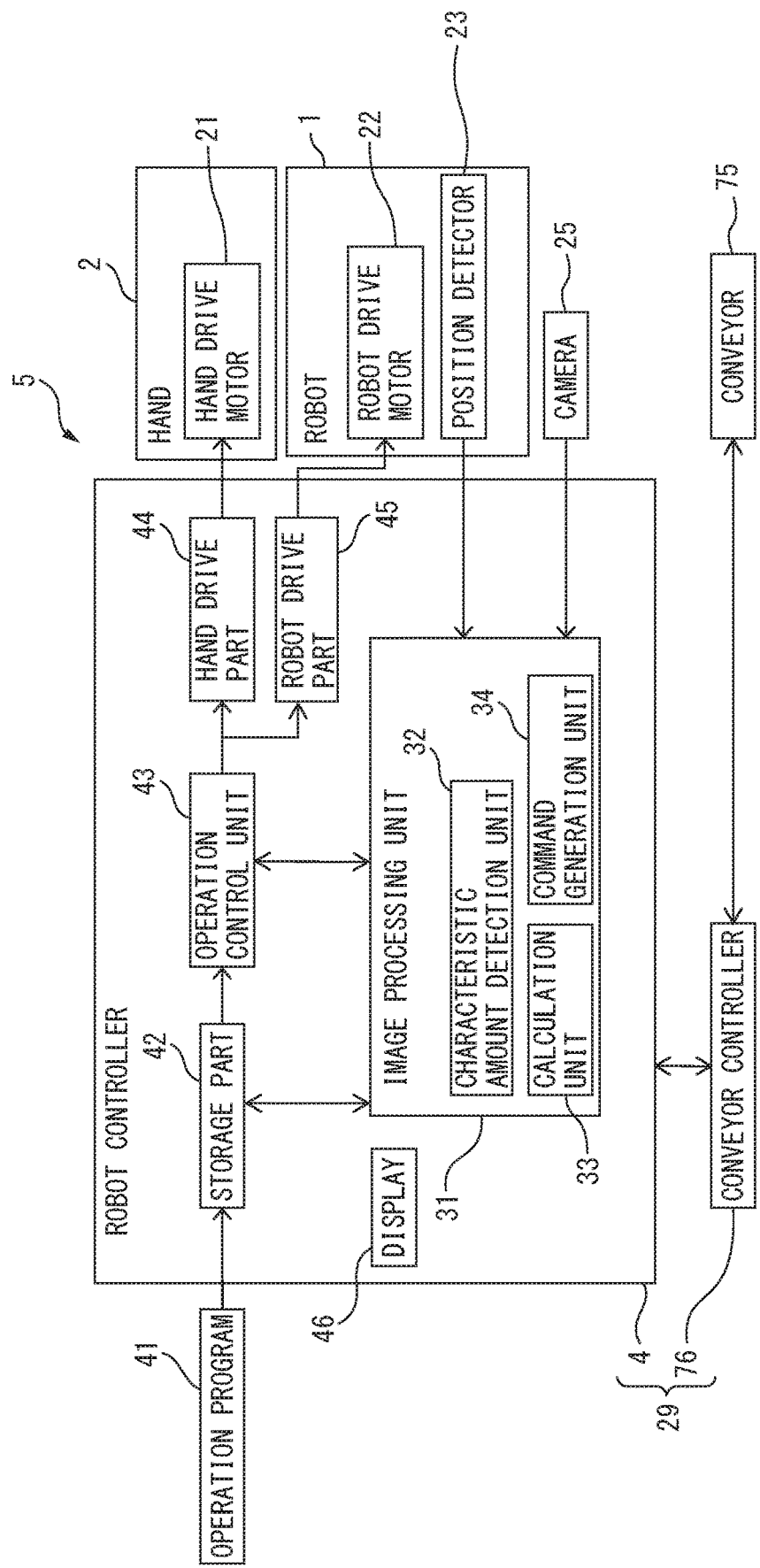
FIG. 3 is a block diagram of the first robot device in the embodiment.

FIG. 3 is a block diagram of the robot device according to the present embodiment. Referring to FIGS. 1 to 3, the robot 1 includes a robot drive device which changes the position and orientation of the robot 1. The robot drive device includes a robot drive motor 22 which drives components such as an arm and a wrist. The robot drive motor 22 is driven and thereby causes the direction of each component to change.

The hand 2 includes a hand drive device which drives the hand 2. The hand drive device includes a hand drive motor 21 which drives the claw parts 3 of the hand 2, The hand drive motor 21 is driven and thereby causes the claw parts 3 of the hand 2 to open or close. Note that the claw parts may be formed to be actuated by air pressure. In this respect, the hand drive device may include a device such as an air pump and a cylinder which drives the claw parts by air pressure.

A controller 29 for the robot device 5 includes a robot controller 4 which controls the robot 1 and the hand 2. The robot controller 4 includes an arithmetic processing device (computer) having a CPU (Central Processing Unit) as a processor. The arithmetic processing device includes, for example, a RAM (Random Access Memory) and a ROM (Read Only Memory) connected to the CPU via a bus. An operation program 41, which is previously created so as to control the robot 1, the hand 2, and the conveyor 75, is input to the robot controller 4. The robot 1 and the hand 2 convey the workpiece 91 based on the operation program 41. The conveyor 75 conveys the workpiece 81 based on the operation program 41.

The arithmetic processing device of the robot controller 4 includes a storage part 42 which stores predetermined information. The storage part 42 stores information related to control of the robot 1, the hand 2, and the conveyor 75. The storage part 42 can be comprised of a storage medium capable of storing information, such as a volatile memory, a non-volatile memory, or a hard disk. The operation program 41 is stored in the storage part 42. The robot controller 4 includes a display 46 which displays any information related to the robot device 5. The display 46 includes, for example, a liquid crystal display panel.

The arithmetic processing device includes an operation control unit 43 which transmits an operation command for the robot 1 and the hand 2. The operation control unit 43 corresponds to the processor driven according to the operation program 41. The operation control unit 43 is formed so as to be able to read the information stored in the storage part 42. The processor functions as the operation control unit 43 by reading the operation program 41 and performing a control operation determined in the operation program 41.

The operation control unit 43 transmits an operation command for driving the robot 1 to the robot drive part 45 based on the operation program 41. The robot drive part 45 includes an electric circuit which drives the robot driving motor 22. The robot drive part 45 supplies electricity to the robot drive motor 22 based on the operation command. The operation control unit 43 also transmits an operation command for driving the hand 2 to the hand drive part 44 based on the operation program 41. The hand drive part 44 includes an electric circuit which drives the hand drive motor 21. The hand drive part 44 supplies electricity to the hand drive motor 21 based on the operation command. Furthermore, the camera 25 is connected to the robot controller 4 of the present embodiment. The operation control unit 43 transmits a command for capturing an image to the camera 25 based on the operation program 41.

The arithmetic processing device of the robot controller 4 includes an image processing unit 31 which processes an image captured by the camera 25. The image processing unit 31 has a characteristic amount detection unit 32 which detects a characteristic amount of a characteristic portion which is a predetermined distinctive portion in each of the workpieces 81 and 91. The image processing unit 31 includes a calculation unit 33 which calculates, as a relative amount, the difference between the characteristic amount of the first workpiece 81 and the characteristic amount of the second workpiece 91. The image processing unit 31 has a command generation unit 34 which generates a movement command for operating the robot 1 based on the relative amount calculated by the calculation unit 33.

The image processing unit 31 corresponds to a processor which is driven according to the operation program 41. In particular, each unit of the characteristic amount detection unit 32, the calculation unit 33, and the command generation unit 34 corresponds to a processor which is driven according to the operation program 41. The processor functions as each unit by reading the operation program 41 and executing a control operation determined in the operation program 41.

The robot device 5 includes a state detector which detects the operation state of the robot device 5. The state detector of the present embodiment includes a position detector 23 which detects the position and orientation of the robot 1. The position detector 23 is attached to the robot drive motor 22 for the drive axis of a component such as an arm. For example, the position detector 23 detects a rotation angle at which the robot drive motor 22 is driven. The position and orientation of the robot 1 are detected based on the output of the position detector 23.

The controller 29 for the robot device 5 includes a conveyor controller 76 which controls the operation of the conveyor 75. The conveyor controller 76 includes an arithmetic processing device (computer) including, for example, a CPU and a RAM. The conveyor controller 76 is formed so as to be able to mutually communicate with the robot controller 4. The operation controller 43 transmits an operation command for driving the conveyor 75 to the conveyor controller 76 based on the operation program 41. The conveyor controller 76 receives the operation command from the robot controller 4 and drives the conveyor 75.

The controller 29 for the robot device 5 according to the present embodiment includes the robot controller 4 which controls the robot 1 and the hand 2, and the conveyor controller 76 which controls the conveyor 75, but the embodiment is not limited to this. The robot device 5 may be formed so that one controller controls the robot 1, the hand 2, and the conveyor 75.

Further, in the controller 29 for the robot device 5 according to the present embodiment, the robot controller 4 includes the image processing unit 31 having a function for processing an image, but the embodiment is not limited to this. The controller for the robot device may include an image processing device (computer) having the image processing unit 31. The image processing device can be composed of an arithmetic processing device having a CPU as a processor. The processor for the image processing device functions as a characteristic amount detection unit, a calculation unit, and a command generation unit, which are driven based on the operation program. The image processing device is formed so as to be able to mutually communicate with the robot controller.

Figure 4:
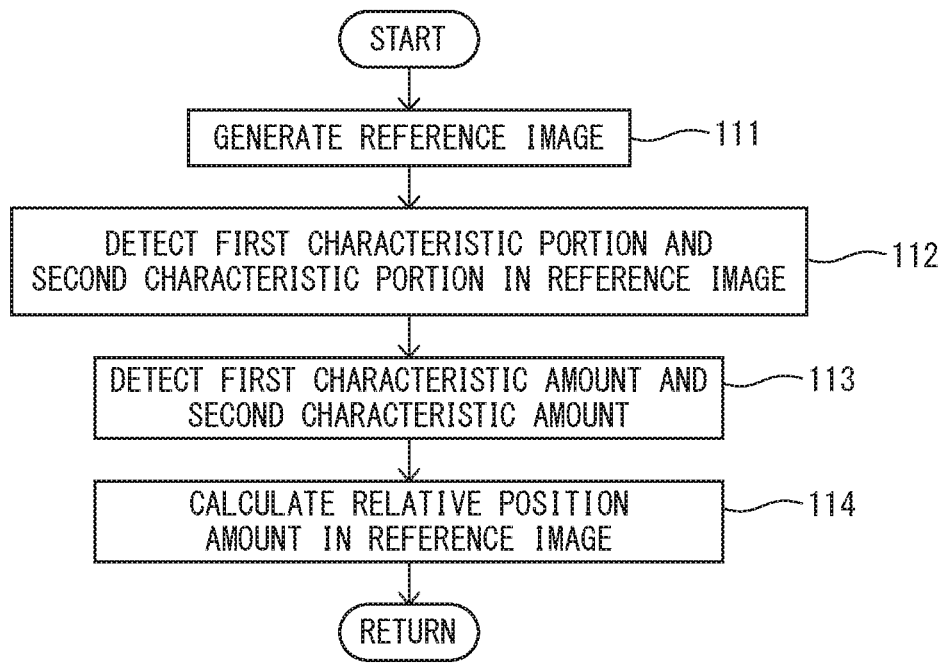
FIG. 4 is a first flowchart of first control of the first robot device in the embodiment.

FIG. 4 is a first flowchart of the first control in the present embodiment. Referring to FIGS. 1, 2, and 4, the first control causes the workpiece 91 to be aligned with the workpiece 81 conveyed by the conveyor 75, by using an image captured by a single camera 25. As described above, the orientation of the workpiece 91 with respect to the orientation of the workpiece 81 is previously adjusted before the first control. In other words, the orientation of the robot 1 is adjusted before the camera 25 captures an image. In this control, the pin 92a is aligned with the hole 82a.

In the present embodiment, a relative position amount in the reference image is calculated before the robot device 5 actually performs an operation. The robot device 5 then performs the operation using the previously calculated relative position amount of the reference image. The first flowchart shows a control operation for calculating the relative position amount in the reference image.

Figure 5:
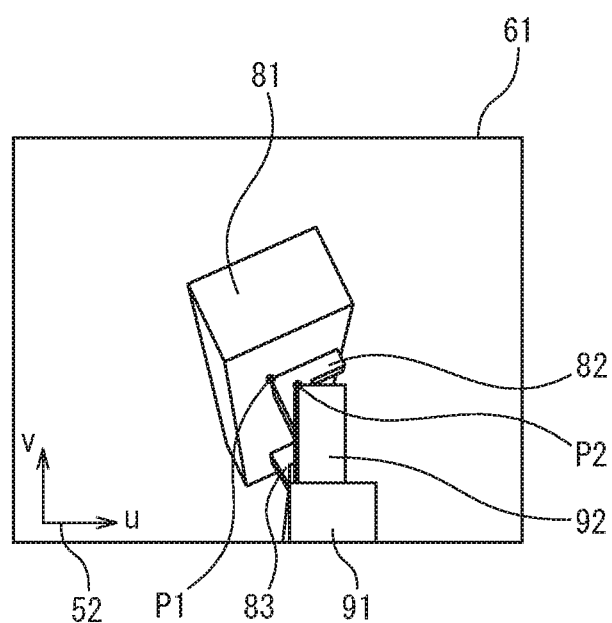
FIG. 5 is a reference image of the first robot device in the embodiment.

At step 111, a reference image for performing the first control is generated. FIG. 5 shows a reference image for performing the first control of the present embodiment. The reference image 61 corresponds to an image captured by the camera 25 when the second workpiece 91 is arranged at the target position with respect to the first workpiece 81. In the present embodiment, the reference image 61 is an image captured by the camera 25 when the pins 92a and 93a of the workpiece 91 are arranged directly above the holes 82a and 83a of the workpiece 81. The reference image 61 can be prepared by an operator and stored in the storage part 42.

In the present embodiment, a first characteristic portion for detecting the position of the first workpiece 81 is previously determined. In the first control, the upper surface of the projection part 82 is set as the first characteristic portion. Further, a second characteristic portion for detecting the position of the second workplace 91 is previously determined. In the first control, the upper surface of the projection part 92 is set as the second characteristic portion. The characteristic portion is the portion in which a shape can be detected when an image is analyzed. As a characteristic portion, a part of a workpiece, a pattern formed on the surface of the workpiece, a line or a drawing depicted on the surface of the workpiece, or the like can be adopted. Further, it is preferable that a characteristic portion is set in the vicinity of a contact portion between the second workpiece 91 and the first workpiece 81.

In the present embodiment, a set point P1 set on the upper surface of the projection part 82 serving as the first characteristic portion in the first workpiece 81. The set point P1 is set at a corner of the projection part 82. The position of the set point P1 corresponds to the position of the workpiece 81. The set point P2 arranged on the upper surface of the projection part 92 as the second characteristic portion in the second workpiece 91. The set point P2 is set at a corner or the projection part 92. The set point P2 corresponds to the position of the workpiece 91. The set points P1 and P2 are set in regions included in the image captured by the camera 25.

Referring to FIGS. 3, 4, and 5, at step 112, the characteristic amount detection unit 32 of the image processing unit 31 detects the first characteristic portion and the second characteristic portion of the reference image 61. In a method for detecting a characteristic portion, a base image which serves as a criterion for each of the workpieces 81 and 91 can be prepared. A characteristic portion in the image captured by the camera 25 can be detected by a method such as template matching, using the base image and the image captured by the camera 25. In this example, the upper surface of the projection part 82 and the upper surface of the projection part 92 can be detected.

At step 113, the characteristic amount detection unit 32 detects the first characteristic amount related to the position of the first characteristic portion and the second characteristic amount related to the position of the second characteristic portion. In the present embodiment, a screen coordinate system 52 is set for the image captured by the camera 25. The screen coordinate system 52 is a coordinate system, the origin of which is set at any point in the image. The screen coordinate system 52 has a u-axis and a v-axis which are orthogonal to each other. The screen coordinate system 52 corresponds to a visual sensor coordinate system of the camera 25.

The characteristic amounts related to the positions in the present embodiment are a coordinate value of the u-axis and a coordinate value of the v-axis of the screen coordinate system 52 in the image. The characteristic amount detection unit 32 can detect, based on characteristic portions detected in the reference image 61, the positions of the set points P1 and P2 which are set in the characteristic portions. The characteristic amount detection unit 32 detects, as the first characteristic amount, a coordinate value (u1b, v1b) of the set point P1 on the screen coordinate system 52. The characteristic amount detection unit 32 also detects, as the second characteristic amount, a coordinate value (u2b, v2b) of the set point P2 on the screen coordinate system 52.

Subsequently, at step 114, the calculation unit 33 of the image processing unit 31 calculates a relative amount related to the first characteristic amount and the second characteristic amount in the reference image. The calculation unit 33 calculates a relative position amount as a relative amount in order to control the position of the robot 1. The relative position amount is a difference between the first characteristic amount and the second characteristic amount. For example, the calculation unit 33 calculates, as the relative position amount, a difference (u1b−u2b, v1b−v2b) between the coordinate value of the first characteristic amount and the coordinate value of the second characteristic amount. The relative position amount in the reference image 61 calculated by the calculation unit 33 is stored in the storage part 42 as a reference relative position amount.

In this way, the image processing unit 31 can calculate the relative position amount in the reference image 61. Note that, in the present embodiment, the relative position amount in the reference image 61 previously calculated and stored in the storage part 42. However, the embodiment is not limited to this. The relative position amount in the reference image 61 may be calculated each time the first control is performed. The reference image 61 does not have to be an image actually captured by the camera 25. For example, three-dimensional data of each of the workpieces 81 and 91 can be generated by, for example, a CAD (Computer Aided Design) device. It is possible to generate three-dimensional data when the workpiece 91 is arranged at the target position with respect to the workpiece 81. The reference image 61 may be generated by projecting the three-dimensional data on one plane in the direction corresponding to the orientation of the camera. Subsequently, the robot controller 4 performs a control operation for moving the pin 92a of the second workpiece 91 closer to the hole 82a of the first workpiece 81 so that the first characteristic portion and the second characteristic portion are arranged inside an imaging range 25a of the camera 25. This control operation can be performed by any control operation. For example, the robot controller 4 detects the positron of the workpiece 81 on the conveyor 75 by using a predetermined sensor. The robot controller 4 detects the position of the workpiece 81 based on the movement speed of the conveyor 75. The robot controller 4 can control the position and orientation of the robot 1 so that the workpiece 91 moves closer to the workpiece 81.

Figure 6:
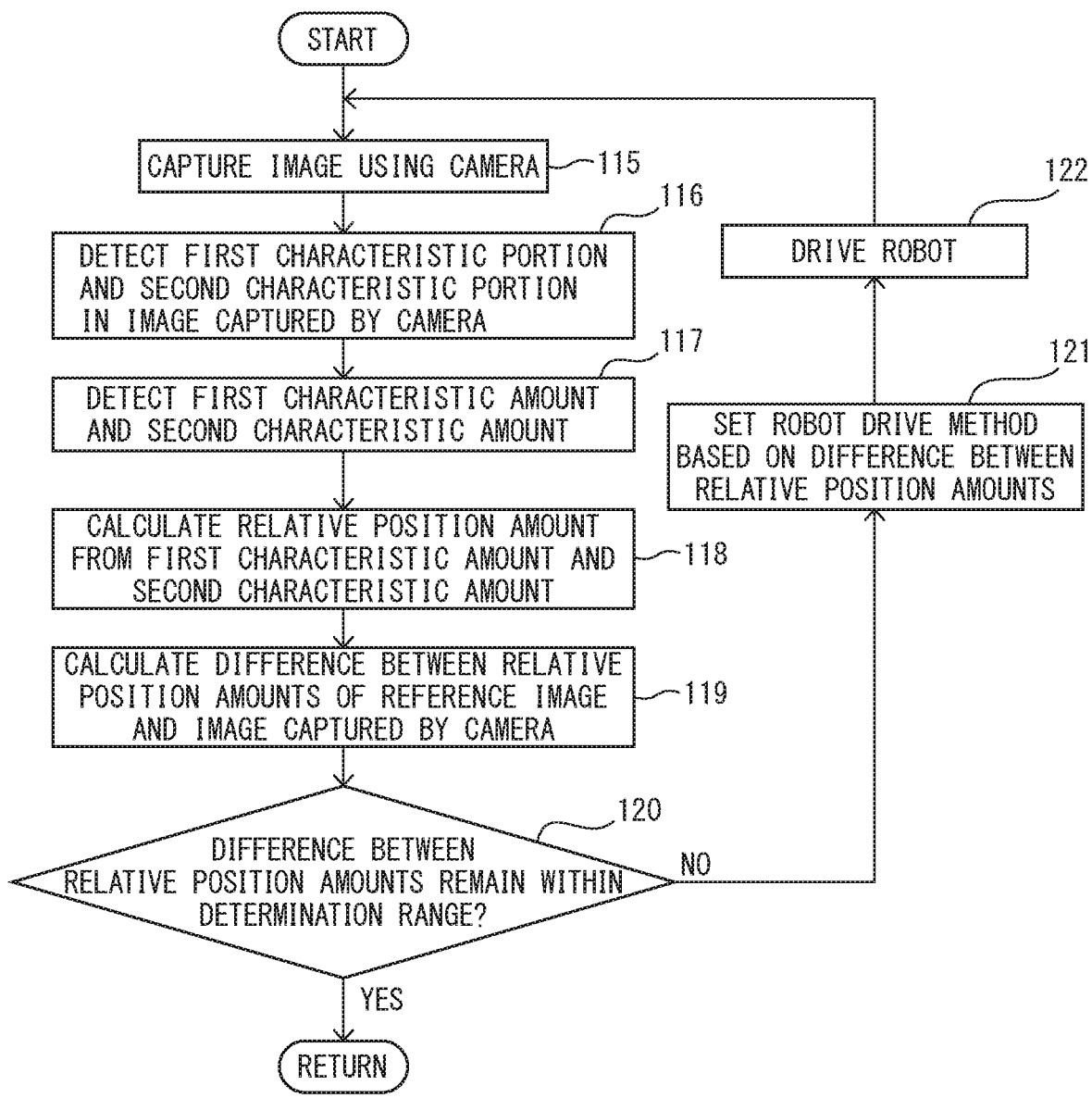
FIG. 6 is a second flowchart of the first control of the first robot device in the embodiment.

FIG. 6 is a second flowchart of the first control in the present embodiment. Referring to FIGS. 3 and 6, after the robot controller 4 performs a control operation for moving the workpiece 91 closer to the workpiece 81, at step 115, the operation control unit 43 causes the camera 25 to capture images of the workpieces 81 and 91.

Figure 7:
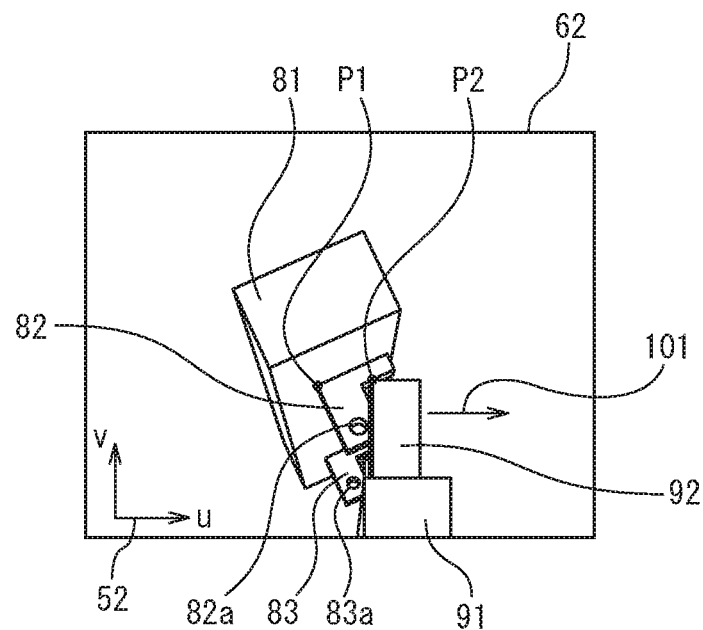
FIG. 7 shows an image in which the second workpiece is misaligned with the first workpiece.

FIG. 7 shows an image captured by the camera in order to adjust the position of the second workpiece with respect to the first workpiece. The image 62 includes an image of the upper surface of the projection part 82 which is the first characteristic portion and an image of the upper surface of the projection part 92 which is the second characteristic portion. In the image 62, the second workpiece 91 is displaced from the first workpiece 81 toward the positive side of the u-axis of the screen coordinate system 52 as designated by arrow 101.

Figure 8:
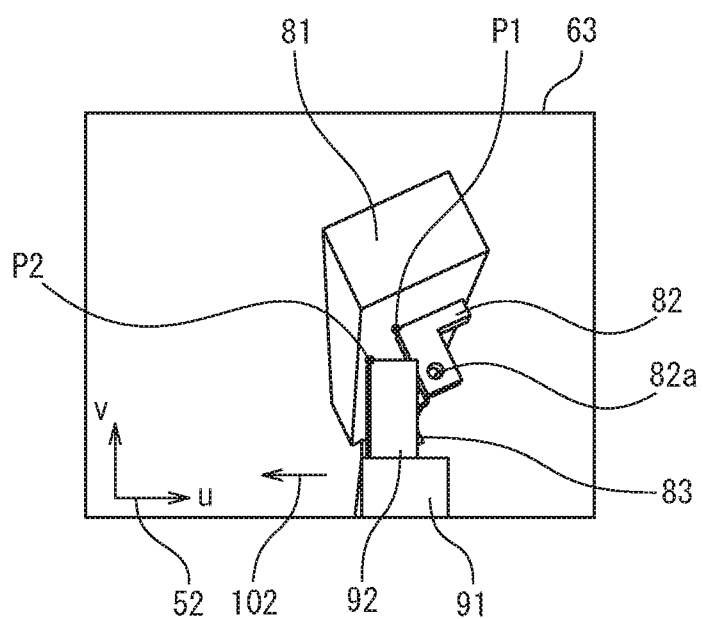
FIG. 8 shows another image in which the second workpiece is misaligned with the first workpiece.

FIG. 8 shows another image captured by the camera in order to adjust the position of the second workpiece with respect to the first workpiece. In the image 63, the second workpiece 91 is displaced from the first workpiece 81 toward the negative side of the u-axis of the screen coordinate system 52 as designated by arrow 102. Referring to FIGS. 7 and 8, in the first control, a control operation for correcting such a displacement of the second workpiece 91 is performed. Here, FIG. 7 of FIGS. 7 and 8 will be taken as an example for description.

Referring to FIGS. 3, 6, and 7, at steps 116 to 118, the same control as the control for the reference image 61 is performed. The image processing unit 31 detects the first characteristic amount and the second characteristic amount in the image 62 captured by the camera 25 and calculates the relative position amount using the first characteristic amount and the second characteristic amount.

At step 116, the characteristic amount detection unit 32 detects the first characteristic portion and the second characteristic portion of the image 62 captured by the camera 25. The upper surface of the projection part 82 of the workpiece 81 is detected as the first characteristic portion, and the upper surface of the projection part 92 of the workpiece 91 is detected as the second characteristic portion.

At step 117, the characteristic amount detection unit 32 detects the first characteristic amount and the second characteristic amount in the image 62 captured by the camera 25. The characteristic amount detection unit 32 detects, as the first characteristic amount related to the position of the first characteristic portion, a coordinate value (u1m, v1m) of the set point P1 on the screen coordinate system 52. Further, the characteristic amount detection unit 32 calculates, as the second characteristic amount related to the position of the second characteristic portion, a coordinate value (u2m, v2m) of the set point P2 on the screen coordinate system 52.

At step 118, the calculation unit 33 calculates, as the relative position amount, the difference between the first characteristic amount and the second characteristic amount. The relative position amount in the image 62 captured by the camera 25 is a difference (u1m−u2m, v1m−v2m) between the coordinate value of the first characteristic amount and the coordinate value of the second characteristic amount.

Note that, when the second workpiece 91 is grasped at a predetermined position of the hand 2, the second characteristic amount related to the second workpiece 91 is constant. Thus, the second characteristic amount may be previously measured and stored in the storage part 42. In other words, the coordinate value of the set point 92 may be previously stored in the storage part 42. Meanwhile, the hand 2 may deviate from a desired position when grasping the second workpiece 91. For this reason, in the present embodiment, the second characteristic amount is also detected by a method for matching with the base image by template matching, based on the actually captured image 62.

Subsequently, the command generation unit 34 of the image processing unit 31 generates a movement command for the robot 1 so that the second workpiece 91 is arranged at the target position with respect to the first workpiece 81, based on the relative position amount in the image 62 captured by the camera 25 and the relative position amount in the reference image 61. The command generation unit 34 of the present embodiment generates a movement command for operating the robot 1 so that the relative position amount in the image 62 captured by the camera 25 approaches the relative position amount in the reference image 61.

At step 119, the command generation unit 34 calculates the difference between the relative position amounts, which is the difference between the relative position amount in the image 62 captured by the camera 25 and the relative position amount in the reference image 61. In the present embodiment, the command generation unit 34 calculates the difference between the relative position amounts by subtracting the relative position amount in the reference image 61 from the relative position amount in the image 62 captured by the camera 25. The difference between the relative position amounts can be represented by [(u1m−u2m)−(u1b−u2b), (v1m−v2m)−(v1b−v2b)] as a value for each of the u-axis and the v-axis. As described above, in the present embodiment, the difference between the relative position amounts related to the u-axis and the difference between the relative position amounts related to the v-axis are calculated.

Subsequently, at step 120, the command generation unit 34 determines whether the difference between the relative position amounts remains within a predetermined determination range. The determination range is previously determined and stored in the storage part 42. For example, the determination range of the value related to the u-axis and the determination range of the value related to the v-axis can be preset. The closer the second workpiece 91 is to the target position with respect to the first workpiece 81, the closer the difference between the relative position amounts becomes to zero. When the value related to the u-axis remains within the determination range and the value related to the v-axis remains within the determination range, the difference between the relative position amounts can be determined to remain within the determination range. In other words, the command generation unit 34 can determine that the alignment of the workpiece 91 with the workpiece 81 has been completed.

Meanwhile, when at least either the value related to the u-axis or the value related to the v-axis deviates from the determination range, the command generation unit 34 can determine that the difference between the relative position amounts deviates from the determination range. In other words, the command generation unit 34 can determine that the workpiece 91 has not reached a desired position with respect to the workpiece 81.

At step 120, when the difference between the relative position amounts remains within the determination range, the control ends. At step 120, when the difference between the relative position amounts deviates from the determination range, the control proceeds to step 121.

At step 121, the command generation unit 34 sets a driving method for the robot 1 based on the difference between the relative position amounts. The command generation unit 34 sets a movement direction and a movement amount of the position of the robot 1 in the reference coordinate system 51. In the present embodiment, the movement direction of the position of the robot for the difference between the relative position amounts is previously determined. The movement direction of the position of the robot 1 in reference coordinate system 51 is determined with respect to a positive value or a negative value of the u-axis of the screen coordinate system 52. For example, when the difference between the relative position amounts related to the u-axis is a positive value, the movement direction of (1, 1, 0) is previously determined using the coordinate values of the X-axis, Y-axis, and Z-axis of the reference coordinate system 51. Further, when the difference between the relative positions related to the v-axis is a positive value, the movement direction of (0, 0, 1) is previously determined using the coordinate values of the X-axis, Y-axis, and Z-axis of the reference coordinate system 51.

Furthermore, a method for calculating the movement amount of the position of the robot 1 with respect to the difference between the relative position amounts is previously determined. For example, as the movement amount of the position of the robot 1 in a direction corresponding to the u-axis, a value obtained by multiplying a value related to the u-axis ((u1m−u2m)−(u1b−u2b)) by a predetermined coefficient can be adopted. Further, as the movement amount of the position of the robot 1 in a direction corresponding to the v-axis, a value obtained by multiplying a value related to the v-axis ((v1m−v2m)−(v1b−v2b)) by a predetermined coefficient can be adopted. In this way, the movement amount of the position of the robot 1 can be calculated in the direction corresponding to each axis of the screen coordinate system 52.

In the present embodiment, the movement amount in the X-axis direction, the movement amount in the Y-axis direction, and the movement amount in the Z-axis direction in the reference coordinate system 51 are calculated based on the difference between the relative position amounts related to the u-axis. Further, the movement amount in the X-axis direction, the movement amount in the Y-axis direction, and the movement amount in the Z-axis direction in the reference coordinate system 51 are calculated based on the difference between the relative position amounts related to the v-axis. Thus, in the reference coordinate system 51, two movement amounts (a movement amount related to the u-axis and a movement amount related to the v-axis) may be calculated for one axis. In this respect, the position of the robot 1 may not move in the direction of the axis in which the two movement amounts are calculated. Alternatively, the final movement amount may be calculated by multiplying each movement amount by a coefficient. Alternatively, either one of the movement amounts may be adopted.

Subsequently, at step 122, the robot 1 is driven based on the movement direction and movement amount of the position of the robot 1. The command generation unit 34 generates a movement command for driving the robot 1 based on the movement direction and the movement amount of the position of the robot 1. The command generation unit 34 transmits a movement command to the operation control unit 43. The operation control unit 43 causes the robot 1 to change its position based on the movement command.

Subsequently, the control proceeds to step 115. In the first control, steps 115 to 122 are repeated until the difference between the relative position amounts falls within the determination range. In the first control, even when the workpieces are not aligned by one control operation, the workpieces can be gradually brought close to desired positions by repeating steps 115 to 122.

In the control of the present embodiment, it is not necessary to calibrate the visual sensor coordinate system with respect to the reference coordinate system. Alternatively, it is not necessary to previously obtain a Jacobian matrix in order to align the workpieces. Thus, the workpieces can be aligned by a simple method.

In the first control of the present embodiment, the position of the second workpiece 91 is adjusted in the period during which the first workpiece 81 is conveyed by the conveyor 75. A control operation for detecting the first characteristic amount and the second characteristic amount by the characteristic amount detection unit 32, a control operation for detecting the relative position amount by the calculation unit 33, and a control operation for calculating the movement command by the command generation unit 34, are repeated. This control enables the position of the robot 1 which grasps the workpiece 91 to follow the position of the workpiece 81 which is conveyed by the conveyor 75.

Note that the camera 25 in the present embodiment is supported by the hand 2 via the support member 17. The hand 2 grasps the second workpiece 91. Thus, the relative position and orientation of the workpiece 81 with respect to the camera 25 are constant while the second workpiece 91 is aligned with the first workpiece 81. Referring to FIGS. 5, 7, and 8, even when the relative position of the second workpiece 91 with respect to the first workpiece 81 changes, the positions of the workpiece 91 and the projection part 92 in the images 62 and 63 captured by the camera 25 is constant. As a result, the position of the set point 92 of the second characteristic portion in the image captured by the camera 25 is constant.

Referring to FIG. 6, in the control described above, every time the camera 25 captures an image of the first workpiece 81 and an image of the second workpiece 91, the second characteristic portion of the second workpiece 91 is detected, and the second characteristic amount is detected. Meanwhile, the coordinate value of the set point 82 which is the second characteristic amount is constant, and accordingly, the storage part 42 can store the second characteristic amount acquired from the image captured by the camera 25 for the first time. For the images captured by the camera 25 for the second and subsequent times at steps 115 to 117, the characteristic amount detection unit 32 can acquire the second characteristic amount from the storage part 42. The characteristic amount detection unit 32 is only required to detect the first characteristic portion and the first characteristic amount. This control is performed so that a control operation for calculating the relative position amount from the images captured by the camera for the second and subsequent times can be simplified. The processing time for the images captured by the camera for the second and subsequent times is shortened.

In the meantime, in the present embodiment, the movement direction and movement speed of the first workpiece 81 to be moved by the conveyor 75 are previously determined. The robot controller 4 can perform feedforward control for changing the position of the robot 1 in accordance with the movement of the workpiece 81 by the conveyor 75. In the present embodiment, the workpiece 81 moves at a constant movement speed.

The command generation unit 34 calculates the movement direction and the movement speed of the position of the robot 1, in which the position of the robot 1 follows the position of the first workpiece 81 moved by the conveyor 75. For example, the command generation unit 34 calculates the movement direction so that the tool tip of the robot 1 moves in the movement direction of the workpiece 81. The command generation unit 34 can calculate the movement amount at which the tool tip of the robot 1 moves in the same direction as the movement direction of the workpiece 81, at the same movement speed as the workpiece 81. Then, the command generation unit 34 can control the movement direction and the movement amount of the position of the robot 1 based on the conveyance of the conveyor 75, and can further control the movement direction and the movement amount calculated based on the difference between the relative position amounts described above.

By adopting this control, the position and orientation of the robot 1 related to the movement of the first workpiece 81 by the conveyor 75 can be changed by feedforward control. In the control based on the difference between the relative position amounts, it is only required to correct the relative positional deviation of the second workpiece 91 with respect to the first workpiece 81, and accordingly, the second workpiece 91 can be aligned with the first workpiece 81 in a short time.

Figure 9:
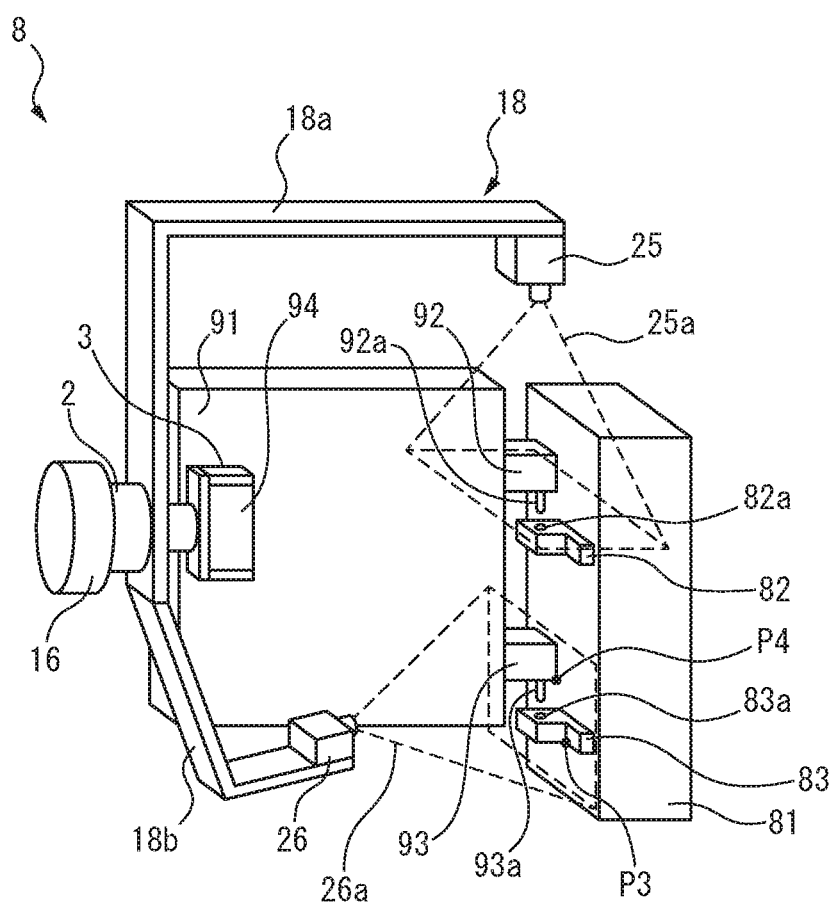
FIG. 9 is an enlarged perspective view of a first workpiece, a second workpiece, and a hand in a second robot device in the embodiment.

FIG. 9 is an enlarged perspective view of a hand, a first workpiece, and a second workpiece in a second robot device in the present embodiment. In the first robot device 5, the position of the robot 1 is adjusted by one camera 25. However, the embodiment is not limited to this. The robot device can adjust the position of the robot 1 using two or more cameras.

In the second robot device 8, a support member 18 is secured to the hand 2. The support member 18 has an upward extending portion 18a and a downward extending portion 18b. As in the first robot device 5, a camera 25 as a first visual sensor is secured to the upward extending portion 18a. The camera 25 captures an image in an imaging range 25a. A camera 26 as a second visual sensor is secured to the downward extending portion 18b. The camera 26 captures images of the first workpiece 81 and the second workpiece 91. In particular, the camera 26 captures an image when the second workpiece 91 moves closer to the first workpiece 81. The camera 26 is arranged so as to be able to capture images of the projection part 83 of the first workpiece 81 and the projection part 93 of the second workpiece 91. The downward extending portion 18b supports the camera 26 so that the images of the projection parts 83 and 93 can be captured from the sides of the workpieces 81 and 91. The camera 26 captures an image in the imaging range 26a. The camera 26 of the present embodiment is a two-dimensional camera.

The two cameras 25 and 26 are arranged so that their optical axes extend in different directions. In the present embodiment, the camera 26 is arranged so that the optical axis of the camera 26 extends in a direction substantially orthogonal to the optical axis of the camera 25. The second robot device 8 performs second control based on the images captured by the two cameras 25 and 26. In the second control, the position of the workpiece 91 with respect to the workpiece 81 is adjusted using the images captured by the cameras 25 and 26.

In the second control, a movement command is generated, based on the image of the camera 25, by the first control. Further, the movement command is generated, based on the image of the camera 26, by a method similar to that of the first control. In the present embodiment, a third characteristic portion for detecting the position of the first workpiece 81 and a fourth characteristic portion for detecting the position of the second workpiece 91 are previously determined in the image captured by the camera 26.

The third characteristic portion is different from the first characteristic portion. As the third characteristic portion, for example, a side surface of the projection part 83 of the first workpiece 81 can be set. A third set point P3 for defining the position of the first workpiece 81 can be set in the third characteristic portion. The fourth characteristic portion is different from the second characteristic portion. As the fourth characteristic portion, for example, a side surface of the projection part 93 of the second workplace 91 can be set. A fourth set point P4 for defining the position of the second workpiece 91 can be set in the fourth characteristic portion.

The characteristic amount detection unit 32 detects the third characteristic amount related to the position of the third characteristic portion and the fourth characteristic amount related to the position of the fourth characteristic portion in the image captured by the camera 26. In the image captured by the camera 26, the coordinate value of the set point P3 on the screen coordinate system 52 is the third characteristic amount. Further, the coordinate value of the set point P4 on the screen coordinate system 52 is the fourth characteristic amount. The calculation unit 33 calculates, as the relative position amount, the difference between the third characteristic amount and the fourth characteristic amount.

Further, the reference image related to the image captured by the camera 26 when the second workpiece 91 is arranged at a target position with respect to the first workpiece 81 is previously created. Further, the relative position amount in the reference image, which is the difference between the third characteristic amount and the fourth characteristic amount, is determined. The relative position amount in the reference image can be previously calculated.

The command generation unit 34 calculates the difference between the relative position amounts based on the relative position amount in the image captured by the camera 26 and the relative position amount in the reference image including the images of the third characteristic portion and the fourth characteristic portion. The command generation unit 34 then generates a movement command for operating the robot 1 so that the second workpiece 91 is arranged at a target position with respect to the first workpiece 81, based on the difference between the relative position amounts. The command generation unit 34 generates a movement command for operating the robot 1 so that the relative position amount in the image captured by the second camera 26 approaches the relative position amount in the reference image.

The command generation unit 34 can generate a final movement command to be transmitted to the operation control unit 43, based on the movement command generated from the image of the camera 25 and the movement command generated from the image of the camera 26. For example, the command generation unit 34 can drive the robot 1 by one of the movement command based on the image of the camera 25 and the movement command based on the image of the camera 26, and then drive the robot 1 by the other movement command.

Alternatively, the movement command based on the image of the camera 25 and the movement command based on the image of the camera 26 may be combined. For example, when the movement direction of the position of the robot 1 related to the u-axis in the image captured by the camera 25 and the movement direction of the position of the robot 1 related to the u-axis in the image captured by the camera 26 match with each other, the average value of the movement amounts of the robot 1 may be calculated. The control for adjusting the position of the robot 1 can be repeated until the difference between the relative position amounts based on the image captured by the camera 25 falls within the determination range, and the difference between the relative position amounts based on the image captured by the camera 26 falls within the determination range.

In the second robot device 8, the cameras 25 and 26 capture images of different characteristic portions so as to perform position control. Thus, the position of the workpiece 91 can be adjusted more accurately than the control for adjusting the position using one camera. Further, the position of the workpiece can be adjusted based on the images captured by a plurality of cameras without performing, for example, stereo measurement. Furthermore, the position of the workpiece can be adjusted by a plurality of two-dimensional cameras without using a three-dimensional camera.

Note that the position of the set point P2 in the image captured by the first camera 25 and the position of the set point P4 in the image captured by the second camera 26 do not change. Thus, as in the first control, the second characteristic amount and the fourth characteristic amount which are detected at the beginning can be stored in the storage part 42. In the control performed for the second and subsequent times, the second characteristic amount and the fourth characteristic amount which are stored in the storage part 42 may be acquired and the relative position amount in each image may be calculated.

In the meantime, in the second robot device 8, a plurality of cameras 25 and 26 are arranged. In a controller for the robot device 8, the position of the workpiece 91 can be adjusted and the orientation of the workpiece 91 can be corrected. Subsequently, the correction of the orientation of the workpiece 91 will be described.

Figure 10:
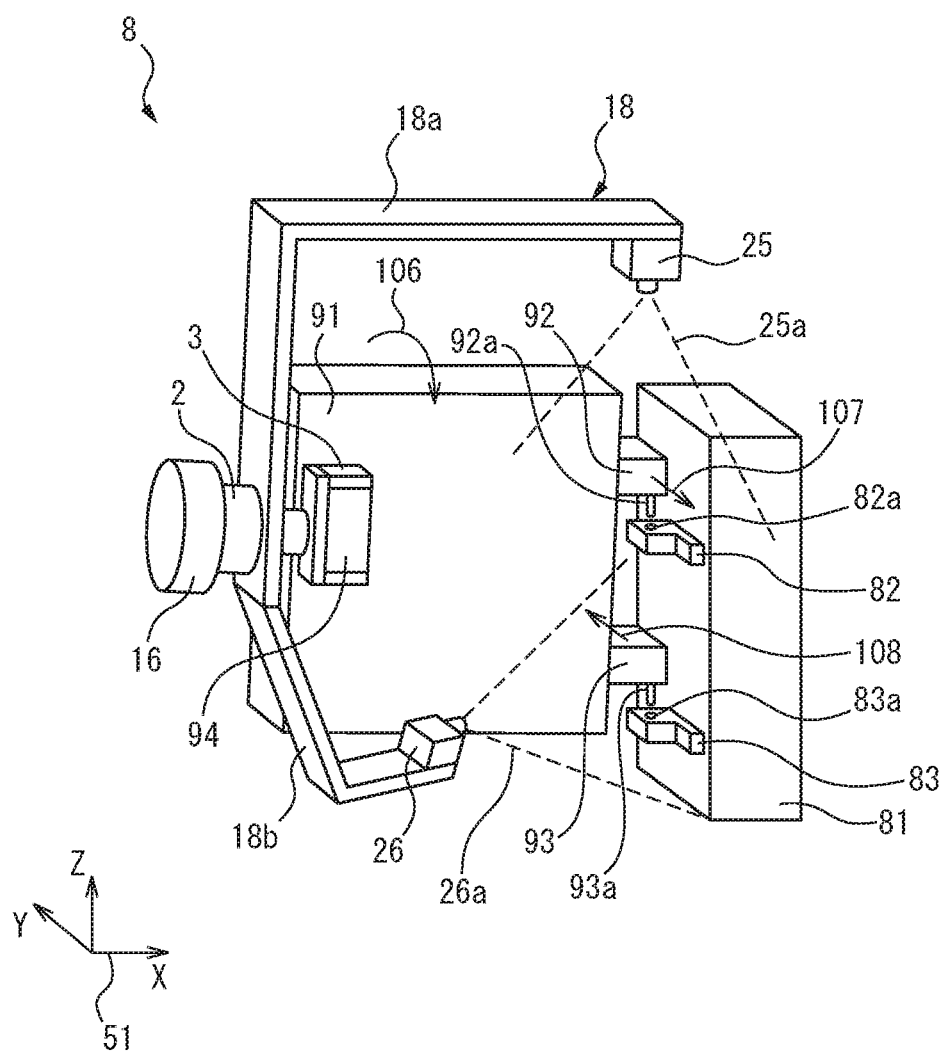
FIG. 10 is an enlarged perspective view of the first workpiece, the second workpiece, and the hand when the orientation of the second workpiece deviates from that of the first workpiece, in the second robot device.

FIG. 10 is another enlarged perspective view of the hand, the first workpiece, and the second workpiece in the second robot device in the present embodiment. In the first control and the second control, the relative orientation of the second workpiece 91 with respect to the first workpiece 81 is adjusted before the position of the second workpiece 91 is adjusted. Meanwhile, the orientation of the second workpiece 91 may deviate from that of the first workpiece 81.

When the workpiece 91 takes a target orientation, the direction in which the pin 92a and the pin 93a are arranged is parallel to the direction in which the holes 82a and 83a are arranged. In the example shown in FIG. 10, the orientation of the workpiece 91 is slightly rotated from the target orientation as indicated by arrow 106. The workpiece 91 slightly rotates around the X-axis of the reference coordinate system 51 in the direction from the Y-axis to the Z-axis. The workpiece 91 slightly rotates around the rotation axis of the flange 16 from the target orientation. As a result, the projection part 92 of the workpiece 91 is displaced from the projection part 82 of the workpiece 81 toward the negative side of the Y-axis, as designated by arrow 107. Further, the projection part 93 of the workpiece 91 is displaced from the projection part 83 of the workpiece 81 toward the positive side of the Y-axis, as designated by arrow 108.

The plurality of the cameras 25 and 26 in the present embodiment are formed to capture images of the portions which are spaced from each other in the second workpiece 91. The first camera 25 is arranged so as to capture an image of the projection part 92 as a portion arranged on one side of the second workpiece 91 in a predetermined direction. Further, the second camera 26 is arranged so as to capture an image of the projection part 93 as a portion arranged on the other side of the second workpiece 91 in the predetermined direction. The predetermined direction corresponds to the direction in which the pins 92a and 93a are aligned.

Figure 11:
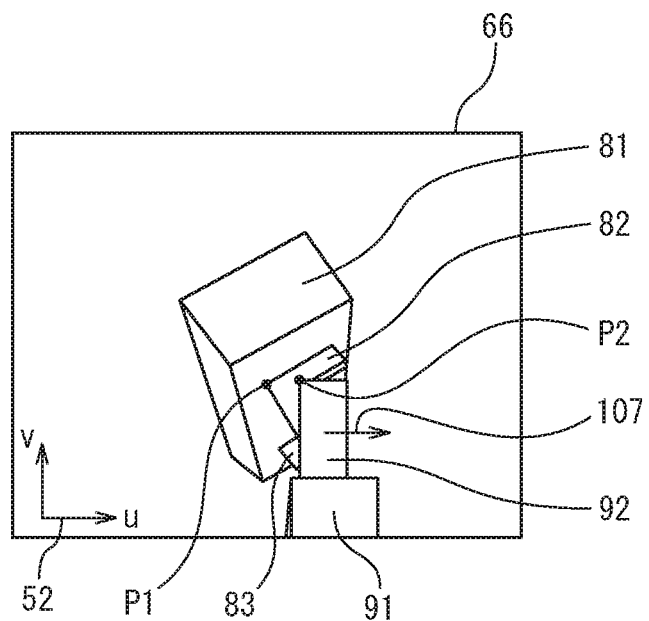
FIG. 11 shows an image captured by a first camera when the orientation of the second workpiece deviates from that of the first workpece.

FIG. 11 shows an image captured by the first camera when the orientation of the second workpiece deviates from that of the first workpiece. Referring to FIGS. 10 and 11 and FIG. 5 which is the reference image, the relative position of the workpiece 91 with respect to the workpiece 81 in the image 66 is different from the relative position of the workpiece 91 with respect to the workpiece 81 in the reference image 61. The projection part 92 of the workpiece 91 is displaced from the projection part 82 of the workpiece 81 as indicated by arrow 107. Further, the extending direction of the pin 92a secured to the projection part 92 and the extending direction of the hole 82a formed in the projection part 82 are not parallel to each other but are different from each other.

Figure 12:
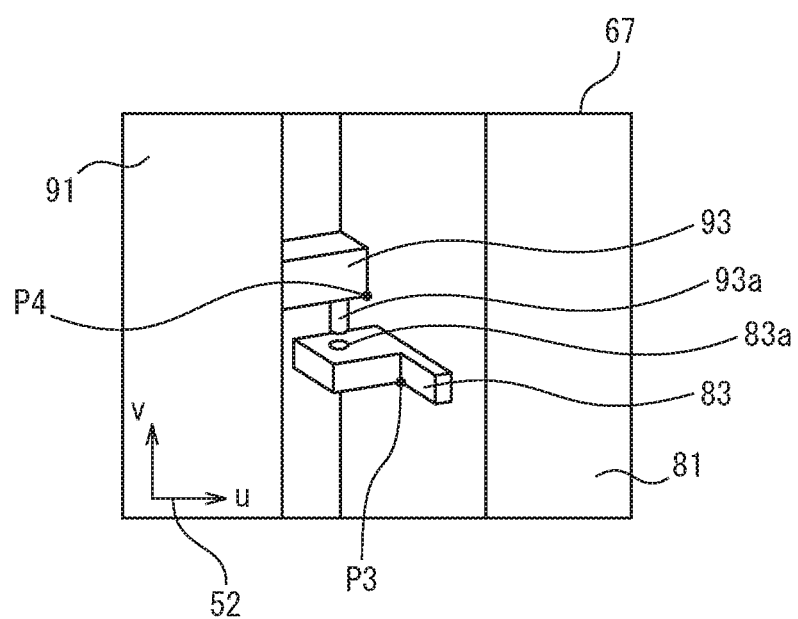
FIG. 12 shows an image captured by a second camera when the orientation of the second workpiece matches with that of the first workpiece.

FIG. 12 shows an image captured by the second camera when the orientation of the second workpiece with respect to the first workpiece is a target orientation. In the image 67, the extending direction of the pin 93a secured to the projection part 93 and the extending direction of the hole 83a formed in the projection part 83 are parallel. Thus, by performing alignment of the workpiece 91 with the workpiece 81, the pin 93a can be inserted into the hole 83a.

Figure 13:
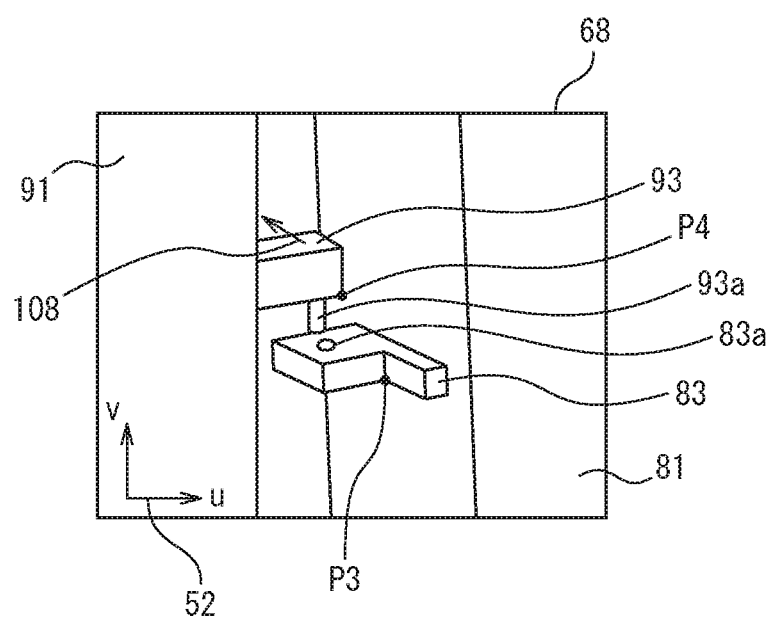
FIG. 13 is an image captured by the second camera when the orientation of the second workpiece deviates from that of the first workpiece.

FIG. 13 shows an image captured by the second camera when the orientation of the second workpiece deviates from that of the first workpiece. In the image 68, the workpiece 91 slightly rotates with respect to the workpiece 81 as indicated by arrow 108. Referring to FIGS. 10, 12, and 13, the relative position of the projection part 93 with respect to the projection part 83 in the image 68 is displaced as indicated by arrow 108. The extending direction of the pin 93a is not parallel to the extending direction of the hole 83a. Thus, even when the tip of the pin 93a is arranged directly above the tip of the hole 83a, the pin 93a cannot be inserted into the hole 83a. In third control of the present embodiment, the relative orientation of the second workpiece 91 with respect to the first workpiece 81 is corrected.

Figure 14:
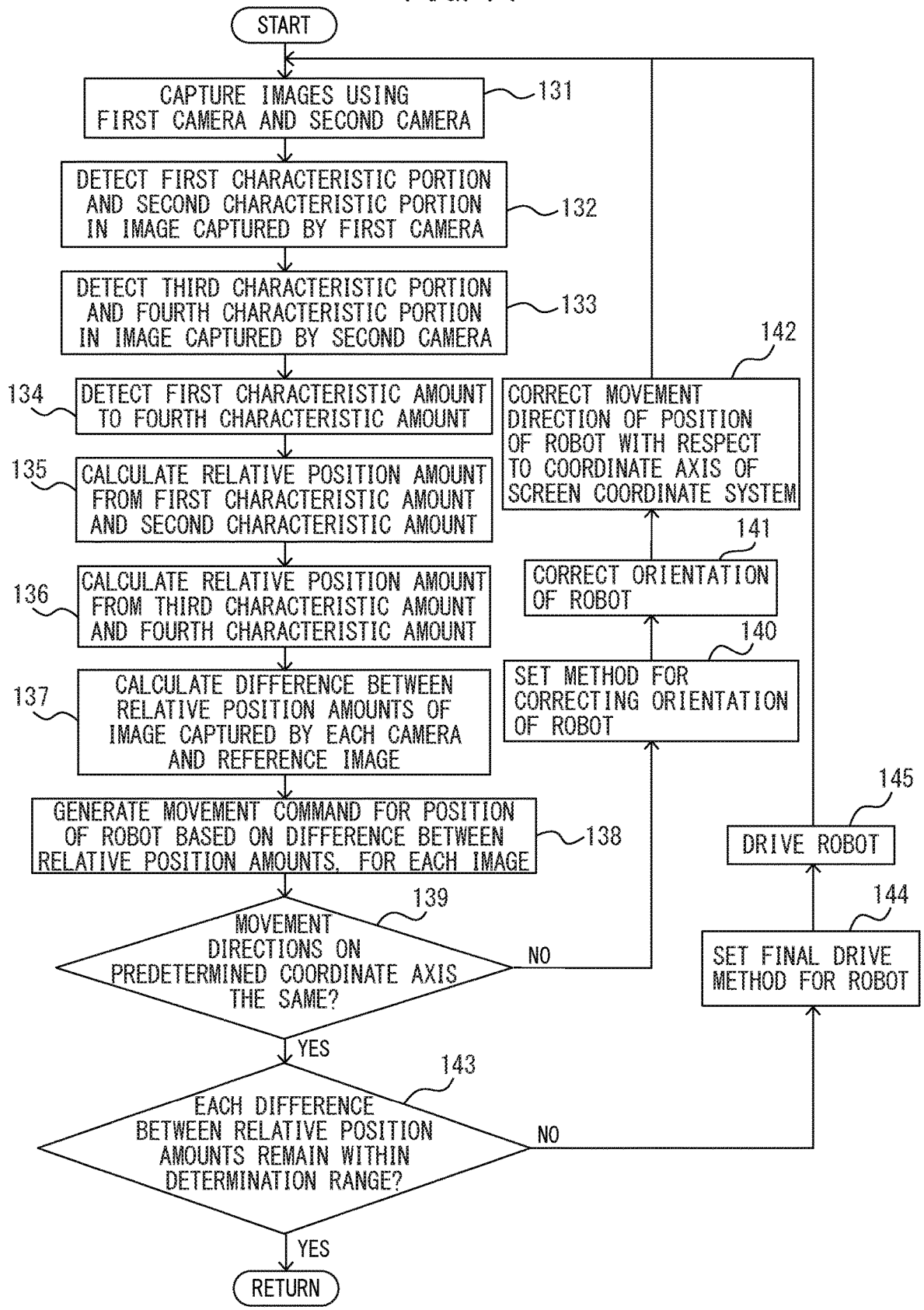
FIG. 14 is a flowchart of third control in the second robot device.

FIG. 14 is a flowchart of the third control in the second robot device of the present embodiment. In the third control, the orientation of the workpiece 91 is corrected in addition to the second control.

Steps 131 to 138 are identical to the steps of the second control. At step 131, the first camera 25 and the second camera 26 capture images. At step 132, the characteristic amount detection unit 32 detects the first characteristic portion and the second characteristic portion in the image captured by the first camera 25. At step 133, the characteristic amount detection unit 32 detects the third characteristic portion and the fourth characteristic portion in the image captured by the second camera 26.

At step 134, the characteristic amount detection unit 32 detects the first characteristic amount related to the position of the first characteristic portion, the second characteristic amount related to the position of the second characteristic portion, and the third characteristic amount related to the position of the third characteristic portion, and the fourth characteristic amount related to the position of the fourth characteristic portion. Referring to FIG. 11, the characteristic amount detection unit 32 detects, as the first characteristic amount, the coordinate value of the set point P1 on the screen coordinate system 52 in the image 66 captured by the first camera 25. Further, the characteristic amount detection unit 32 detects, as the second characteristic amount, the coordinate value of the set point P2 on the screen coordinate system 52. Referring to FIG. 13, the characteristic amount detection unit 32 detects, as the third characteristic amount, the coordinate value of the set point P3 on the screen coordinate system 52 in the image 68. The characteristic amount detection unit 32 detects, as the fourth characteristic amount, the coordinate value of the set point P4 on the screen coordinate system 52.

Referring to FIG. 14, at step 135, the calculation unit 33 of the image processing unit 31 calculates the relative position amount based on the first characteristic amount and the second characteristic amount. At step 136, the calculation unit 33 calculates the relative position amount based on the third characteristic amount and the fourth characteristic amount. The calculation unit 33 calculates the relative position amount in the images 66 and 68 captured by the cameras 25 and 26, respectively.

Subsequently, at step 137, regarding the images 66 and 68 respectively captured by the cameras 25 and 26, the command generation unit 34 of the image processing unit 31 calculates the difference between the relative position amounts, which is the difference between the relative position amount in each of the images 66 and 68 and the relative position amount in the reference image. At step 138, the command generation unit 34 generates a movement command for the robot 1, for each of the images 66 and 68, based on the difference between the relative position amounts. The difference between the relative position amounts is calculated as a value related to the u-axis and the v-axis in the screen coordinate system 52. The command generation unit 34 generates a movement command for the robot 1 based on the difference between the relative position amounts.

The command generation unit 34 calculates the movement direction and the movement amount of the position of the robot 1 in the reference coordinate system 51, based on the image 66 captured by the camera 25. Further, the command generation unit 34 calculates the movement direction and the movement amount of the position of the robot 1 in the reference coordinate system 51 based on the image 68 captured by the camera 26. In other words, the command generation unit 34 calculates the movement amount along the direction of the coordinate axis of the reference coordinate system 51 for each coordinate axis of the reference coordinate system 51.

Subsequently, at step 139, the command generation unit 34 determines whether the orientation of the second workpiece 91 with respect to the first workpiece 81 remains within a predetermined determination range, based on the movement command generated from the image captured by the first camera 25 and the movement command generated from the image captured by the second camera 26.

In the present embodiment, the command generation unit 34 acquires the movement direction of the position of the robot 1 on a predetermined coordinate axis of the reference coordinate system 51. Referring to FIG. 10, in this example, the Y-axis is previously selected from the coordinate axes of the reference coordinate system 51. The command generation unit 34 acquires a Y-axis movement command of the movement commands generated from the image 66 captured by the first camera 25 and a Y-axis movement command of the movement commands generated from the image 68 captured by the second camera 26.

When Y-axis movement directions acquired from the images 66 and 68 captured by the two cameras 25 and 26 are the same, the command generation unit 34 determines that the orientation of the second workpiece 91 with respect to the first workpiece 81 remains within a predetermined determination range. Meanwhile, the command generation unit 34 determines that the orientation of the second workpiece 91 with respect to the first workpiece 81 deviates from the determination range when the Y-axis movement directions are different from each other.

In the examples shown in FIGS. 10 to 13, in the movement command based on the image captured by the first camera 25, a command for moving the robot 1 in a direction opposite to the direction designated by arrow 107 is generated. Further, in the movement command based on the image captured by the second camera 26, a command for moving the robot 1 in a direction opposite to the direction designated by arrow 108 is generated. Thus, at step 139, the command generation unit 34 determines that the Y-axis movement directions based on the images captured by the two cameras are different from each other. In this respect, the control proceeds to step 140.

Note that, in the present embodiment, in a predetermined coordinate axis of the reference coordinate system, the orientation of the workpiece is determined to be within the determination range when the directions in which the position of the robot should move are the same. However, the embodiment is not limited to this. Even when the movement directions on a predetermined coordinate axis are different from each other, the orientation of the workpiece may be determined to be within the determination range if the movement amount is minute.

At step 140, the command generation unit 34 sets a method for correcting the orientation of the robot 1. The command generation unit 34 generates a movement command for rotating the workpiece 91 in a direction opposite to the direction in which the second workpiece 91 is inclined with respect to the first workpiece 81. Referring to FIG. 10, in the present embodiment, the workpiece 91 is controlled so as to rotate, in the direction from the Z-axis to the Y-axis, around the X-axis of the reference coordinate system 51. An orientation correction amount θ which is the rotation amount of the workpiece 91 can be previously determined.

At step 141, the command generation unit 34 transmits a movement command based on the method for correcting the orientation of the robot 1 to the operation control unit 43. The operation control unit 43 corrects the orientation of the robot based on the movement command received from the command generation unit 34.

Subsequently, at step 142, the image processing unit 31 corrects the movement direction of the position of the robot 1 in the reference coordinate system 51 with respect to the coordinate axis of the screen coordinate system 52. The difference between the relative position amounts is calculated by the value related to the u-axis and the v-axis of the screen coordinate system 52. The movement direction of the position of the robot 1 in the reference coordinate system 51, which corresponds to the u-axis and the v-axis of the screen coordinate system 52, is previously determined. When the orientation of the robot 1 is corrected, the movement direction in the reference coordinate system 51, which corresponds to the u-axis and the v-axis of the images captured by the cameras 25 and 26, also changes. In other words, the movement direction of the position of the robot 1 represented by the coordinate values of the X-axis, Y-axis, and Z-axis of the reference coordinate system changes.

The image processing unit 31 corrects the movement direction of the position of the robot 1, which corresponds to the coordinate axis of the screen coordinate system 52, based on the correction amount of the orientation of the robot 1. For example, a transformation matrix calculated based on the correction amount of the orientation of the robot 1 may be multiplied by the coordinate values of the X-axis, Y-axis, and Z-axis of the reference coordinate system 51, which indicate the movement direction of the position of the robot 1, and whereby the movement direction of the position of the robot 1 can be corrected.

After step 142, the control returns to step 131. The control at steps 131 to 139 is then repeated. At step 139, when the movement directions in a predetermined coordinate axis of the reference coordinate system 51 are different from each other, the control at steps 140, 141, and 142 is performed again.

At step 140, a method for correcting the orientation of the robot 1 is set. When the orientation of the robot 1 is corrected by the previous orientation correction amount θ, the direction in which the orientation of the second workplace 91 deviates from that of the first workpiece 81 may be reversed. In this respect, the orientation of the robot 1 is corrected in the direction opposite to the direction in the previous orientation correction. Furthermore, a correction amount which is smaller than the previous correction amount is adopted. For example, the orientation is controlled so as to be changed by a correction amount (−θ/2) which is half the previous correction amount. Meanwhile, even when the orientation of the robot 1 is corrected by the previous orientation correction amount θ, the direction in which the orientation of the second workpiece 91 deviates from that of the first workpiece 81 may be the same as the direction in the previous control. In this respect, the orientation is corrected in the same direction and the same orientation correction amount θ as the previous one. After that, the control at steps 131 to 139 can be repeated again.

In this way, when the correction of the orientation in the previous control causes the direction in which the orientation deviates to be reversed, the orientation of the robot can be corrected so as to be reversed to the opposite direction and the correction amount can be reduced. This control enables the deviation of the orientation of the second workpiece 91 with respect to the first workplace 81 to be gradually corrected. In the images captured by the first camera 25 and the second camera 26, the orientation of the robot 1 can be corrected until the directions of the second workpiece 91 and the first workpiece 81 which are misaligned with each other are equalized.

Note that, at step 139, when the orientation of the second workpiece with respect to the first workpiece deviates from the determination range, any control can be performed. For example, the robot device may be stopped. Further, at step 140, the command generation unit 34 can set a method for correcting the orientation of the robot 1 by any control. For example, the orientation correction amount of the workpiece 81 may be calculated based on the movement amount in the Y-axis direction calculated from the images captured by the two cameras 25 and 26.

At step 139, when the movement direction based on the image captured by the first camera 25 and the movement direction based on the image captured by the second camera 26 are the same, the control proceeds to step 143.

At steps 143 to 145, as in the second control, the position of the robot 1 is determined and corrected. At step 143, it is determined whether each of the difference between the relative position amounts based on the image captured by the first camera 25 and the difference between the relative position amounts based on the image captured by the second camera 26 remains within the determination range. At step 143, when at least one of the differences between the relative position amounts deviates from the determination range, the control proceeds to step 144.

At step 144, the command generation unit 34 generates a final movement command for the robot based on the movement command based on each image. At step 145, the operation control unit 43 then drives the robot 1 based on the final movement command for the robot so as to change the position of the robot 1. After that, the control proceeds to step 131.

At step 143, when the differences between the relative position amounts in the two images remain within the determination range, the position and orientation of the second workpiece 91 with respect to the first workpiece 81 can be determined to be the target position and orientation. The control can then end.

The configuration, action, and effect of the second robot device 6 other than those described above are the same as those of the first robot device 5, and thus, the description thereof will not be repeated below.

Figure 15:
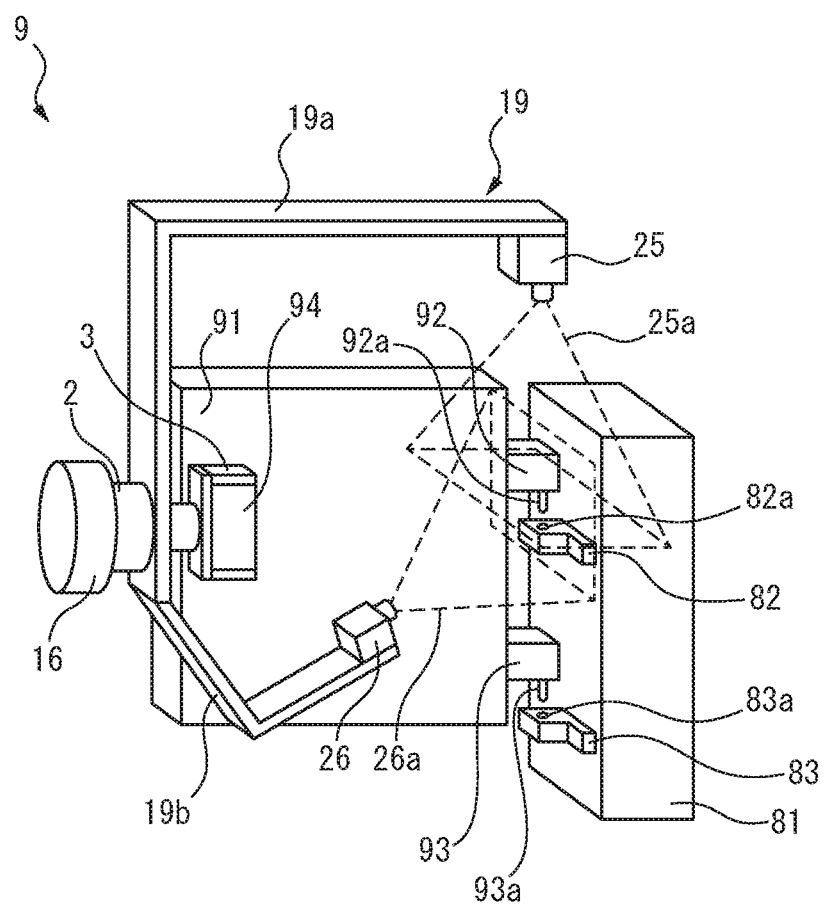
FIG. 15 is an enlarged perspective view of a first workpiece, a second workpiece, and a hand in a third robot device in the embodiment.

FIG. 15 is an enlarged perspective view of a hand, a first workpiece, and a second workpiece of a third robot device in the present embodiment. In the third robot device 9, a support member 19 is secured to the hand 2. The support member 19 has an upward extending portion 19a and a downward extending portion 19b. As in the second robot device 8, a camera 25 serving as a first visual sensor is secured to the upward extending portion 19a. A camera 26 serving as a second visual sensor is secured to the downward extending portion 19b.

The direction of the camera 26 of the third robot device 9 is different from the direction of the camera 26 of the second robot device 8. The downward extending portion 19b of the support member 19 supports the camera 26 so that the imaging range 26a of the camera 26 overlaps the imaging range 25a of the camera 25. The camera 26 of the third robot device 9 is arranged so as to capture an image of the same portion as the portion captured by the camera 25. The camera 26 is arranged so as to be able to capture images of the projection part 82 of the workpiece 81 and the projection part 92 of the workpiece 91.

In the third robot device 9, fourth control is performed in order to align the workpiece 91 with the workpiece 81. In the fourth control, as in the second control for the second robot device 8, a third characteristic portion and a fourth characteristic portion are set, and the position of the robot 1 is adjusted based on the images captured by the cameras 25 and 26. In this embodiment, a side surface of the projection part 82 is set as the third characteristic portion. A side surface of the projection part 92 is set as the fourth characteristic portion. In the third robot device 9, the third characteristic portion may be the same as or different from the first characteristic portion. Further, the fourth characteristic portion may be the same as or different from the second characteristic portion.

The configuration, action, and effect of the third robot device 9 other than those described above are similar to those of the second robot device 8, and thus, the description thereof will not be repeated below.

The controller for the second robot device 8 and the controller for the third robot device 9 include two cameras, but the embodiment is not limited to this. The controller for the robot device may include three or more cameras. The controller may cause each camera to capture an image of the corresponding characteristic portion different from the other characteristic portions, and may control the position and orientation of the workpiece based on the images captured by the cameras.

Figure 16:
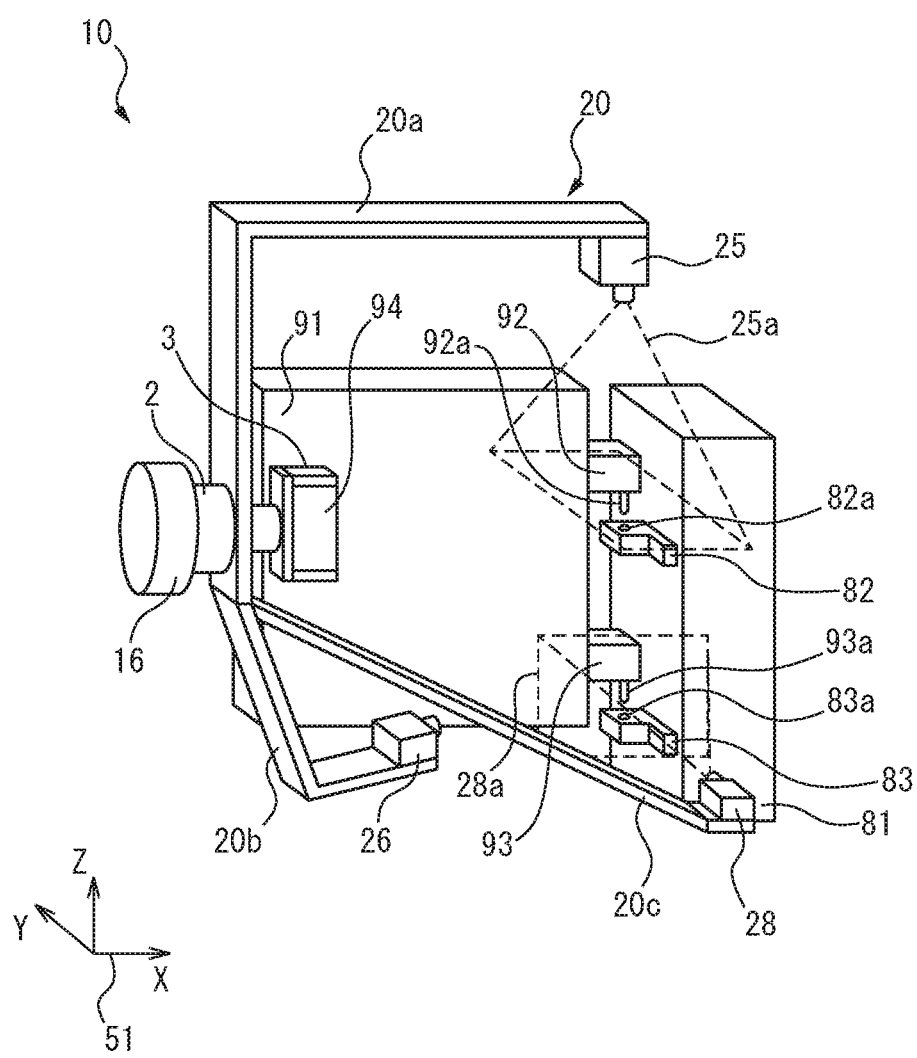
FIG. 16 is an enlarged perspective view of a first workpiece, a second workpiece, and a hand in a fourth robot device in the embodiment.

FIG. 16 is an enlarged perspective view of a hand, a first workpiece, and a second workpiece in a fourth robot device in the present embodiment. The fourth robot device 10 includes a third camera 28 in addition to the first camera 25 and the second camera 26. The fourth robot device 10 has a support member 20 supported by the hand 2. The support member 20 has an upward extending portion 20*a* which supports the camera 25 and a downward extending portion 20*b* which supports the camera 26. Further, the support member 20 has a laterally extending portion 20*c* which supports the camera 28. The camera 28 has an imaging range 28*a*. The camera 28 is arranged so that its optical axis extends in a direction different from the direction of the optical axis of the camera 25 and the direction of the optical axis of the camera 26.

In the fourth robot device 10, fifth control for adjusting the position and orientation of the workpiece 91 with respect to the workpiece 81 is performed. In the fifth control, a fifth characteristic portion is set on the first workpiece 81 in order to process an image captured by the camera 28. Further, a sixth characteristic portion is set on the second workpiece 91. For example, a side surface of the projection part 63 of the workpiece 81 is set as the fifth characteristic portion, and a side surface of the projection part 93 of the workpiece 91 is set as the sixth characteristic portion.

The same control as the first control can be performed for an image captured by the camera 28. The camera 28 is arranged so as to be able to capture images of the fifth characteristic portion and the sixth characteristic portion A fifth set point and a sixth set point for defining the positions of the characteristic portions are set in the fifth characteristic portion and the sixth characteristic portion. The characteristic amount detection unit 32 can detect a fifth characteristic amount corresponding to the fifth characteristic portion and a sixth characteristic amount corresponding to the sixth characteristic portion, based on the position of the set points in the screen coordinate system 52. The reference image for the camera 28 is previously created. The fifth characteristic amount and the sixth characteristic amount in the reference image can be previously calculated. Further, the relative position amount in the reference image can be previously calculated.

In the fifth control, the same control as the third control can be performed. In the fifth control, the position and orientation of the second workpiece 91 with respect to the first workpiece 81 are adjusted by three cameras. In the control for adjusting the position of the workpiece 91 with respect to the workpiece 81, the deviation of the position of the second workpiece 91 from that of the first workpiece 81 can be detected based on the images captured by the three cameras 25, 26, and 28. Thus, the position can be adjusted more accurately than the position which is adjusted by two cameras.

Further, in the control for correcting the orientation of the workpiece 91 with respect to the workpiece 81, the orientation of the workpiece 91 which is displaced around the Y-axis of the reference coordinate system 51 can be corrected based on the image captured by the camera 25 and the image captured by the camera 28. In this way, the number of cameras is increased, and whereby the number of direction in which the deviation of orientation is corrected can be increased.

The configuration, action, and effect of the fourth robot device other than those described above are similar to those of the first robot device 5, the second robot device 8, and the third robot device 9, and thus, the description thereof will not be repeated below.

In the first robot device 5, the second robot device 8, the third robot device 9, and the fourth robot device 10, the cameras 25, 26, and 28 are secured to the hand 2 and move together with the hand 2, but the embodiment is not limited to this. The cameras may be secured to the installation surface, etc. In other words, the cameras may be secured so that the position and orientation of the cameras do not change even when the position and orientation of the robot 1 change.

Figure 17:
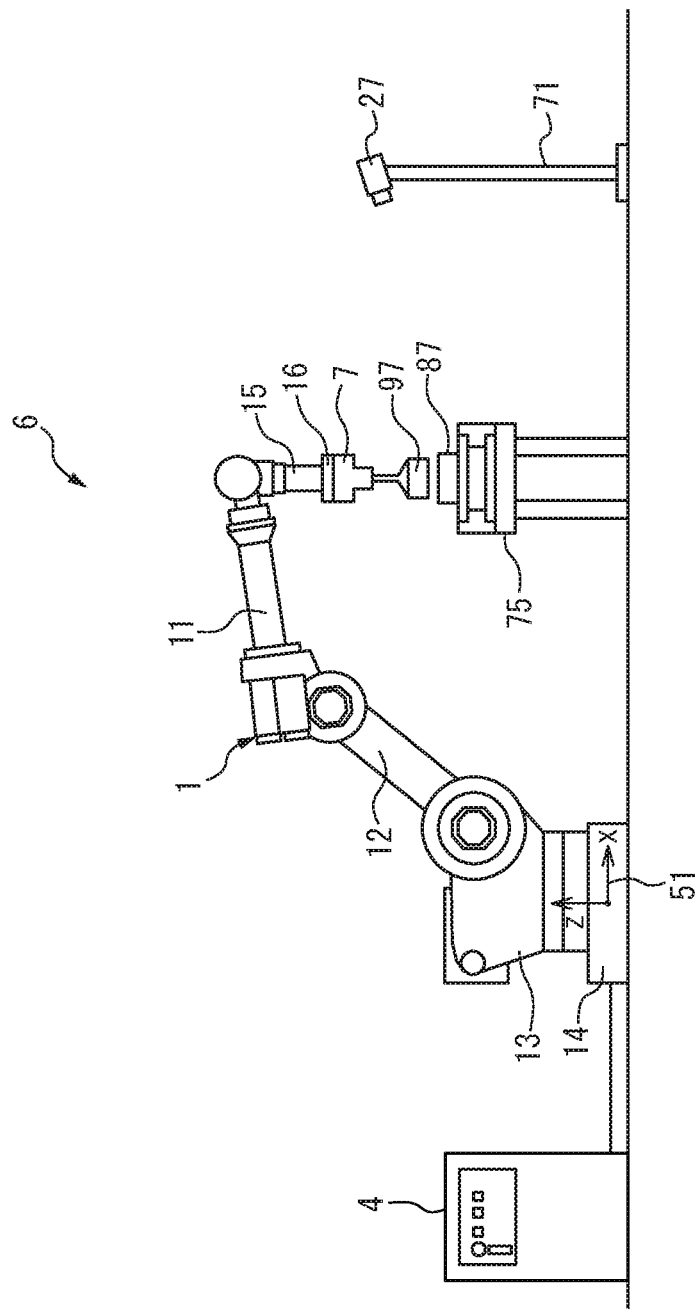
FIG. 17 is a schematic view of a fifth robot device in the embodiment.

FIG. 17 is a schematic view of a fifth robot device in the present embodiment. The fifth robot device 6 arranges the workpiece 97 serving as the second member inside the case 87 serving as the first member. The case 87 corresponds to the first workpiece, and the workpiece 97 corresponds to the second workpiece. The fifth robot device 6 has a hand 7 attached to the robot 1. The hand 7 is formed to grasp the workpiece 97 by suction. The fifth robot device 6 includes a conveyor 75 as a carrier which conveys the case 87.

The fifth robot device 6 has a camera 27 as a visual sensor, which is secured to the installation surface via a mount 71. The camera 27 remains stationary even when the position and orientation of the robot 1 change. The camera 27 is spaced from the conveyor 75 by a sufficient distance so that the images of the workpiece 97 and the case 87 can be captured while the robot 1 is adjusting the position of the workpiece 97.

Figure 18:
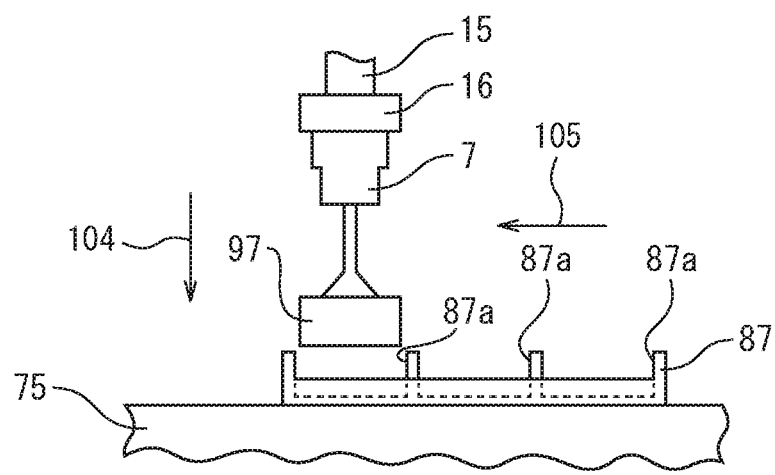
FIG. 18 is an enlarged schematic view of a case, a workpiece, and a hand when the workpiece is aligned with the case.

FIG. 18 is a side view of the fifth robot device when a workplace is tried to be accommodated in a case. The case 87 is conveyed by the conveyor 75 as designated by arrow 105. The case 87 has a plurality of walls 87*a* formed corresponding to the shape of the workpiece 97. The fifth robot device 6 accommodates the workpiece 97 in a region surrounded by the walls 87*a*. In the example shown in FIG. 18, the workpiece 97 is aligned with the region surrounded by the walls 87a. Thus, the workpiece 97 moves downward as designated by arrow 104 and can be accommodated in the case 87.

Figure 19:
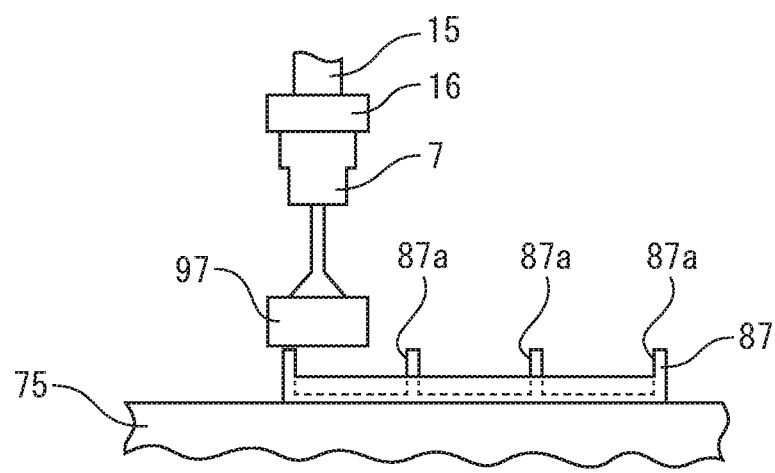
FIG. 19 is an enlarged schematic view of the case, the workpiece, and the hand when the workpiece is misaligned with the case.

FIG. 19 is another side view of the fifth robot device when a workpiece is tried to be accommodated in a case. In the example shown in FIG. 19, the workpiece 97 is misaligned with the region surrounded by the walls 87a. The fifth robot device 6 performs sixth control. In the sixth control, the position of the robot 1 is adjusted so that the workpiece 97 is placed directly above the region surrounded by the walls 87a. The orientation of the workpiece 97 with respect to the case 87 is previously adjusted. In the sixth control, the displacement of the position of the workpiece 97 from the position of the case 87 is corrected by the same control as the first control. As shown in FIG. 18, the reference image, in which the workpiece 97 is aligned with the case 87, is previously created.

Figure 20:
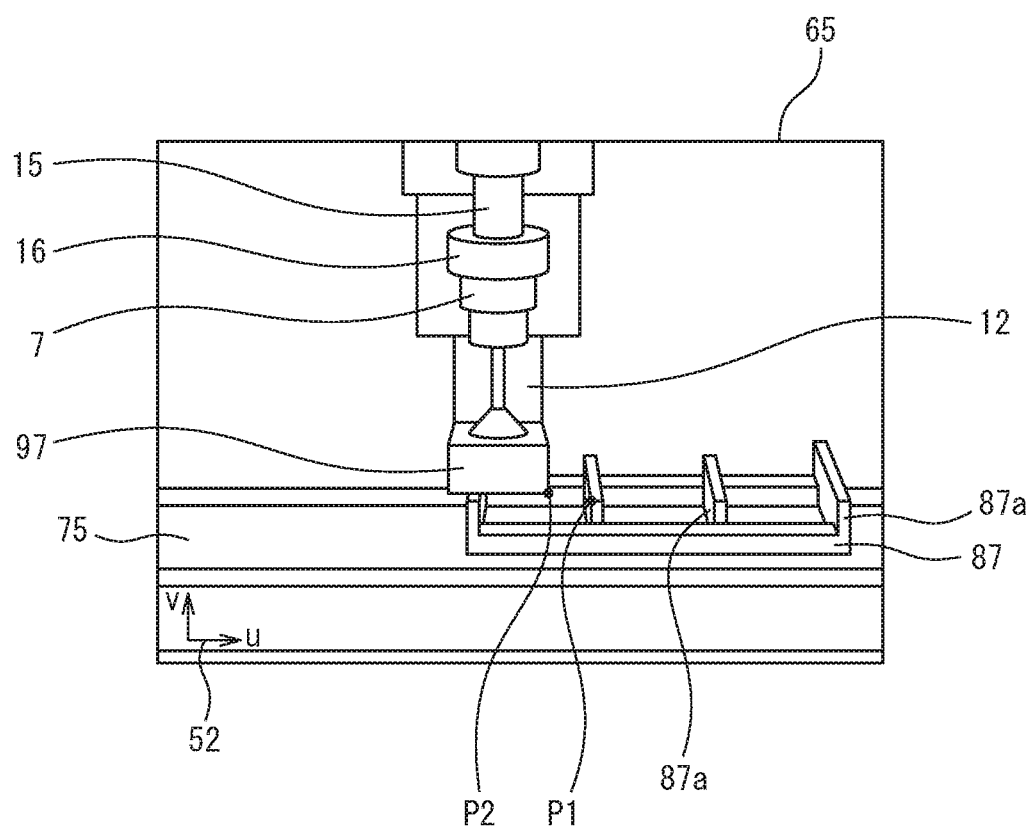
FIG. 20 shows an image in which the workpiece is misaligned with the case.

FIG. 20 shows an image captured by the camera. In the image of FIG. 20, the workpiece 97 is misaligned with the region surrounded by the walls 87a. In the sixth control, for example, a side surface of each wall 87a can be set as the first characteristic portion. A first set point P1 can be set at a corner of the side surface of the wall 87a. Further, a side surface of the workpiece 97 can be set as the second characteristic portion. A second set point P2 can be set at a corner of the side surface of the workpiece 97.

Referring to FIGS. 3 and 20, the characteristic amount detection unit 32 detects the first characteristic amount related to the position of the first characteristic portion and the second characteristic amount related to the position of the second characteristic portion. The calculation unit 33 calculates the relative position amount based on the first characteristic amount and the second characteristic amount. The command generation unit 34 can generate a movement command for operating the robot 1, based on the relative position amount in the image 65 captured by the camera 27 and the relative position amount in the reference image.

Even in a robot device with a fixed camera, the position of the robot can be controlled by the same control as the first control. Further, the same control as the second control, the third control, or the fourth control can be performed using a plurality of cameras secured to, for example, the installation surface.

The configuration, action, and effect of the fifth robot device 6 other than those described above are similar to those of the first robot device 5, the second robot device 8, the third robot device 9, and the fourth robot device 10, and thus, the description thereof will not be repeated below.

The visual sensor in the above embodiment is a two-dimensional camera, but the embodiment is not limited to this. The visual sensor may be a three-dimensional camera capable of detecting the three-dimensional position of a member included in the image. The use of the three-dimensional camera as the visual sensor enables the position of the first member and the position of the second member in the reference coordinate system to be detected without the base image.

In the above embodiments, the robot device for assembling a product and the robot device for inserting a workpiece into a case are adopted. However, the embodiment is not limited to this. The controller of the present embodiment can be applied to a robot device which performs any operation. The controller of the present embodiment can be applied to, for example, a robot device which removes a workpiece from a case, a robot device which performs spot welding, or a robot device which applies an adhesive agent.

The first member and the second member in the above embodiments are workpieces, or a workpiece and a case, but the embodiment is not limited to this. The first member includes any member for which the robot device performs an operation. Further, the second member includes any member which is moved by driving the robot. In particular, the second member may be an operation tool attached to the robot. For example, in a robot device which performs spot welding, a spot-welding gun as an operation tool is attached to the robot. In this respect, the second member is the spot-welding gun. In the spot-welding gun, the second characteristic portion, the fourth characteristic portion, and the sixth characteristic portion can be set as the portions which can be detected in the image captured by the camera.

In the above embodiments, the characteristic portions are set on the surface of a workpiece or a case. However, the embodiment is not limited to this. The characteristic portions may be set at components of the robot, components of the hand, or components of the carrier. For example, in the first to fourth control, no displacement of the workpiece in the hand may occur. Alternatively, the position of the robot may be adjusted in accordance with the displacement of the workpiece in the hand. In these respects, the second characteristic portion, the fourth characteristic portion, and the sixth characteristic portion may be set in the hand when the hand is arranged within the imaging range of the camera.

According to the present disclosure, it is possible to provide a controller for a robot device which accurately controls the position of a robot by a simple method.

In each control described above, the order of steps can be appropriately changed as far as the function and action are not changed.

The above embodiments can be combined appropriately. In each of the drawings described above, the same or similar parts are designated by the same reference numerals. Note that the above embodiments are described for illustrative purposes only, and do not limit the invention. Further, the embodiments include modifications of the embodiments described in the claims.

The invention claimed is:

1. A controller for a robot device in which a robot moves a second member so as to adjust a relative position of the second member with respect to a first member, comprising:
   a visual sensor capturing reference images of the first member and the second member having a previously adjusted orientation, wherein an orientation of the second member is arranged with respect to the first member;
   a processor configured to:
   transmit a command for driving the robot based on an operation program; and
   process, in a first control, the reference images captured by the visual sensor, wherein the processor is further configured to:
   after the driving the robot based on the operation program and the second member being arranged at a target position with respect to the first member, detect a position of a first characteristic portion of the first member and a position of a second characteristic portion of the second member, wherein each of the first and second characteristic portions includes at least one of a pattern formed on a surface of the first and second members, or a line or drawing depicted on a surface of the first and second members in a vicinity of a contact portion between the second member and the first member, calculate a difference between coordinate values of the first characteristic portion and coordinate values of the second characteristic portion as a relative position amount from the respective coordinate values of the first member and second member in the reference images, generate a movement command for operating the robot to move the second member relative to the first member based on the calculated difference, and operate, in a second control, the robot so that a position of the second member is adjusted to the target position with respect to the first member, based on the relative position in the reference images captured by the visual sensor and the calculated relative position.

2. The controller according to claim 1, wherein the processor calculates the difference between relative position amounts, which is the difference between the relative position amount in the reference images captured by the visual sensor and the relative position amount of the first and second characteristic portions, a movement direction of the position of the robot with respect to the difference between the relative position amounts is previously determined, a method for calculating the movement amount of the position of the robot with respect to the difference between the relative position amounts is previously determined, and the processor sets the movement direction and a movement amount of the position of the robot based on the difference between the relative position amounts, and generates a movement command based on the movement direction and the movement amount of the position of the robot.

3. The controller according to claim 1, wherein the robot device includes a carrier for conveying the first member, and a control operation for detecting the first characteristic amount and the second characteristic amount by the processor, a control operation for detecting the relative position amount by the processor, and a control operation for generating a movement command by the processor are repeatedly performed while the carrier conveys the first member.

4. The controller according to claim 3, wherein a movement direction and movement speed of the first member conveyed by the carrier are previously determined, and the processor generates the movement command based on the movement direction and a predefined movement amount of the position of the robot, in which the position of the robot follows the position of the first member conveyed by the carrier.

5. The controller according to claim 1, wherein the visual sensor constitutes a first visual sensor, the controller further comprises a second visual sensor for capturing reference images of the first member and the second member, the processor is further configured to detect a position of a third characteristic portion of the first member and a position of a fourth characteristic portion of the second member based on the reference images captured by the second visual sensor, the processor calculates, as a relative position amount, a difference between the third characteristic portion and the fourth characteristic portion, a relative position amount in the reference images including the images of the third characteristic portion and the fourth characteristic portion when the second member is arranged at a target position with respect to the first member is determined, and the processor generates, based on a relative position amount in an image captured by the second visual sensor and a relative position amount in the reference image including images of the third characteristic portion and the fourth characteristic portion, a movement command for operating the robot so that the second member is arranged at a target position with respect to the first member, and generates, based on a movement command generated from an image captured by the first visual sensor and a movement command generated from an image captured by the second visual sensor, a movement command to be transmitted to the processor.

6. The controller according to claim 5, wherein the first visual sensor is arranged so as to capture an image of a portion arranged on one side of the second member in a predetermined direction, the second visual sensor is arranged so as to capture an image of a portion arranged on another side of the second member in the predetermined direction, wherein the predetermined direction corresponds to a direction in which the portions of the second member are aligned, and the processor determines whether an orientation of the second member with respect to the first member remains within a predetermined determination range based on the movement command generated from the reference image captured by the first visual sensor and the movement command generated from the reference image captured by the second visual sensor.

\* \* \* \* \*